United States Patent
Haddad

(10) Patent No.: US 9,459,374 B2
(45) Date of Patent: Oct. 4, 2016

(54) DERIVATIVE IMAGING FOR SUBSURFACE OBJECT DETECTION

(71) Applicant: Vermeer Manufacturing Company, Pella, IA (US)

(72) Inventor: Waleed Sami Haddad, San Francisco, CA (US)

(73) Assignee: VERMEER MANUFACTURING COMPANY, Pella, IA (US)

( * ) Notice: Subject to any disclaimer, the term of this patent is extended or adjusted under 35 U.S.C. 154(b) by 221 days.

(21) Appl. No.: 14/248,001

(22) Filed: Apr. 8, 2014

(65) Prior Publication Data

US 2014/0219511 A1    Aug. 7, 2014

Related U.S. Application Data

(63) Continuation of application No. 13/026,037, filed on Feb. 11, 2011, now Pat. No. 8,694,258.

(60) Provisional application No. 61/304,467, filed on Feb. 14, 2010.

(51) Int. Cl.

| G06F 19/00 | (2011.01) |
|---|---|
| G01V 11/00 | (2006.01) |
| G01S 13/88 | (2006.01) |
| G01S 13/90 | (2006.01) |

(Continued)

(52) U.S. Cl.
CPC .......... *G01V 11/002* (2013.01); *G01S 13/885* (2013.01); *G01S 13/9035* (2013.01); *G01S 13/9094* (2013.01); *G01V 3/17* (2013.01); *G06F 19/00* (2013.01); *G06T 7/0038* (2013.01); *G06T 2200/21* (2013.01); *G06T 2207/30181* (2013.01)

(58) Field of Classification Search
CPC ..... G01V 1/368; G01V 1/42; G01V 2210/27
USPC .................. 702/7, 6, 1, 3, 14, 182–185, 188
See application file for complete search history.

(56) References Cited

U.S. PATENT DOCUMENTS 4,964,087 A * 10/1990 Widrow ......................... 367/45
5,321,613 A    6/1994 Porter et al.

(Continued)

FOREIGN PATENT DOCUMENTS

WO    WO2009087260    7/2009

OTHER PUBLICATIONS

Stickley et al., "Synthetic Aperture Radar for the Detection of Shallow Buried Objects", IEEE 1996, pp. 160-163.

(Continued)

*Primary Examiner* — Edward Raymond
(74) *Attorney, Agent, or Firm* — Hollingsworth Davis, LLC

(57) ABSTRACT

A series of scans is generated for a subsurface and a derivative image is created using the series of subsurface images. One or more tests are performed on the derivative image, and a subsurface object is detected based on the one or more tests. A sensor is configured to generate a series of scans for a subsurface and a processor is coupled to the sensor. The processor is configured to execute stored program instructions that cause the processor to generate a series of images of the subsurface using the series of scans, create a derivative image using the series of subsurface images, perform one or more tests on the derivative image, and detect a subsurface object based on the one or more tests.

20 Claims, 16 Drawing Sheets

(51) Int. Cl.
*G01V 3/17* (2006.01)
*G06T 7/00* (2006.01)

(56) References Cited

U.S. PATENT DOCUMENTS

| | | |
|---|---|---|
| 5,385,715 A | 1/1995 | Fish |
| 6,701,647 B2 | 3/2004 | Stump |
| 6,751,553 B2 | 6/2004 | Young et al. |
| 6,755,263 B2 | 6/2004 | Alft et al. |
| 7,013,991 B2 | 3/2006 | Wilson-Langman et al. |
| 7,182,151 B2 | 2/2007 | Stump et al. |
| 7,607,494 B2 | 10/2009 | Alft et al. |

OTHER PUBLICATIONS

Brandstadt et al., "Real-Time Processing for Ultra-Wide SAR Sub-Surface Sensing", IEEE 1999, pp. 213-217.
Gu et al., "Migration Based SAR Imaging for Ground Penetrating Radar Systems", IEEE, vol. 151, No. 5, 2004, pp. 317-325.
International Search Report and Written Opinion dated May 26, 2011 from PCT Application No. PCT/US2011/024742, 16 pages.
File History for U.S. Appl. No. 13/026,307.
Zhang et al., "A Test Study of Urban Faults Using Analytical Method of Magnetic Anomaly", Seismology and Geology, vol. 29, No. 2, 2007, pp. 336-353.
Office Action dated May 30, 2014 for Chinese Application No. 201180016402.5, 21 pages.

\* cited by examiner

DERIVATIVE IMAGING FOR SUBSURFACE OBJECT DETECTION

RELATED APPLICATION

This application is a continuation of U.S. patent application Ser. No. 13/026,037, filed Feb. 11, 2011, now U.S. Pat. No. 8,694,258, which claims the benefit of Provisional Patent Application Ser. No. 61/304,467 filed Feb. 14, 2010, to which priority is claimed pursuant to 35 U.S.C. §119(e) and which are hereby incorporated herein by reference.

SUMMARY

According to various embodiments, methods of the disclosure involve generating a series of scans for a subsurface and creating a derivative image using the series of subsurface images. Methods further involve performing one or more tests on the derivative image, and detecting a subsurface object based on the one or more tests.

In accordance with other embodiments, systems of the disclosure include a sensor configured to generate a series of scans for a subsurface and a processor coupled to the sensor. The processor is configured to execute stored program instructions that cause the processor to generate a series of images of the subsurface using the series of scans, create a derivative image using the series of subsurface images, perform one or more tests on the derivative image, and detect a subsurface object based on the one or more tests.

According to other embodiments, automated subsurface obstacle detection involves scanning a subsurface proximate an underground sensor, generating an image of the subsurface using a first subsurface scan, updating the subsurface image using subsurface scans subsequent to the first scan, and calculating a derivative of a parameter of the updated subsurface image. The method further involves forming a derivative image using derivatives of the parameter, performing one or more tests on the derivative image, and generating an output indicating presence of a subsurface obstacle proximate the underground sensor based on the one or more tests.

According to some embodiments, automated subsurface obstacle detection involves scanning a subsurface using an above-ground sensor, generating an image of the subsurface using a first subsurface scan, and updating the subsurface image using subsurface scans subsequent to the first scan. The method further involves calculating a derivative of a parameter of the updated subsurface image, forming a derivative image using derivatives of the parameter, performing one or more tests on the derivative image, and generating an output indicating presence of a subsurface obstacle based on the one or more tests.

In further embodiments, automated subsurface obstacle detection involves moving a drill head coupled to a drill string along an underground path using a drilling machine, and scanning a subsurface proximate the drill head using a sensor mounted at the drill head. The method also involves generating an image of the subsurface using a first subsurface scan, updating the subsurface image using subsurface scans subsequent to the first scan, calculating a derivative of a parameter of the updated subsurface image, and forming a derivative image using derivatives of the parameter. The method further involves performing one or more tests on the derivative image, and generating an output indicating presence of a subsurface obstacle proximate the drill head based on the one or more tests.

In accordance with various embodiments, automated subsurface obstacle detection for a horizontal directional drilling (HDD) system involves generating a series of scans for a subsurface volume using a ground penetrating radar (GPR) mounted at a boring tool to create a SAR image. The method also involves creating a derivative image of the SAR image using a parameter of the SAR image, performing one or more tests on the derivative image, and detecting presence of an object ahead and/or lateral of the bore tool based on the one or more tests.

In other embodiments, automated obstacle detection for an HDD system involves transmitting GPR probe signals into a subsurface ahead and lateral of the drill head, receiving return signals, and producing a SAR image using the return signals. The method also involves measuring a parameter for each pixel of the SAR image, calculating a derivative of the pixel parameter measurement, and forming a derivative SAR image using the calculated derivative measurements. The method further involves testing each pixel of the derivative image for one or more specified conditions, and generating a detection event signal based on meeting the one or more specified conditions, the detection event signal indicating presence of an obstacle ahead or lateral of the drill head and falling within a detection zone of the GPR.

According to further embodiments, a system for automated subsurface obstacle detection includes a housing configured for above-ground portability, an above-ground sensor coupled to the housing and configured for subsurface sensing, and a memory configured to store program instructions for implementing a derivative imaging object detection algorithm. A processor is coupled to the memory and the sensor. The processor is configured to execute stored program instructions for implementing derivative imaging object detection processes comprising: generating an image of the subsurface using a first subsurface scan; updating the subsurface image using subsurface scans subsequent to the first scan; calculating a derivative of a parameter of the updated subsurface image; forming a derivative image using derivatives of the parameter; performing one or more tests on the derivative image; and generating an output indicating presence of a subsurface obstacle based on the one or more tests.

Other embodiments are directed to a system for automated subsurface obstacle detection which includes a housing configured for subsurface deployment, a sensor coupled to the housing and configured for subsurface deployment and subsurface sensing, and a memory configured to store program instructions for implementing a derivative imaging object detection algorithm. A processor is coupled to the memory and the sensor. The processor is configured to execute stored program instructions for implementing derivative imaging object detection processes comprising generating an image of the subsurface using a first subsurface scan; updating the subsurface image using subsurface scans subsequent to the first scan; calculating a derivative of a parameter of the updated subsurface image; forming a derivative image using derivatives of the parameter; performing one or more tests on the derivative image; and generating an output indicating presence of a subsurface obstacle proximate the housing based on the one or more tests.

According to some embodiments, a system for automated subsurface obstacle detection includes an excavation machine comprising a driving unit coupled to an earth penetrating tool, and a sensor mounted on or proximate the earth penetrating tool. The sensor is configured for subsurface sensing. A memory is configured to store program instructions for implementing a derivative imaging object detection algorithm, and a processor is coupled to the memory and the sensor. The processor is configured to execute stored program instructions for implementing derivative imaging object detection processes comprising: scanning a subsurface proximate the earth penetrating tool while the earth penetrating tool advances through a subsurface; generating an image of the subsurface using a first subsurface scan; updating the subsurface image using subsurface scans subsequent to the first scan; calculating a derivative of a parameter of the updated subsurface image; forming a derivative image using derivatives of the parameter; performing one or more tests on the derivative image; and generating an output indicating presence of a subsurface obstacle proximate the earth penetrating tool based on the one or more tests.

In accordance with various embodiments, an HDD system includes a driving unit, a drill string coupled to the driving unit, a drill head coupled to the drill string, and a cutting tool mounted to the drill head. A radar sensor is mounted at the drill head proximal of the cutting tool. The radar sensor comprises a transmitter for transmitting radar probe signals into a subsurface and a receiver for receiving return signals. A processor is coupled to memory and the radar sensor. The processor is configured to execute program instructions stored in the memory for implementing derivative imaging object detection processes comprising: generating a SAR image using the received returned signals; generating a derivative image of the SAR image using a parameter of the SAR image; performing one or more tests on the derivative image; and detecting presence of an object at least ahead of the cutting tool based on the one or more tests.

These and other features can be understood in view of the following detailed discussion and the accompanying drawings.

DETAILED DESCRIPTION

Figure 1:
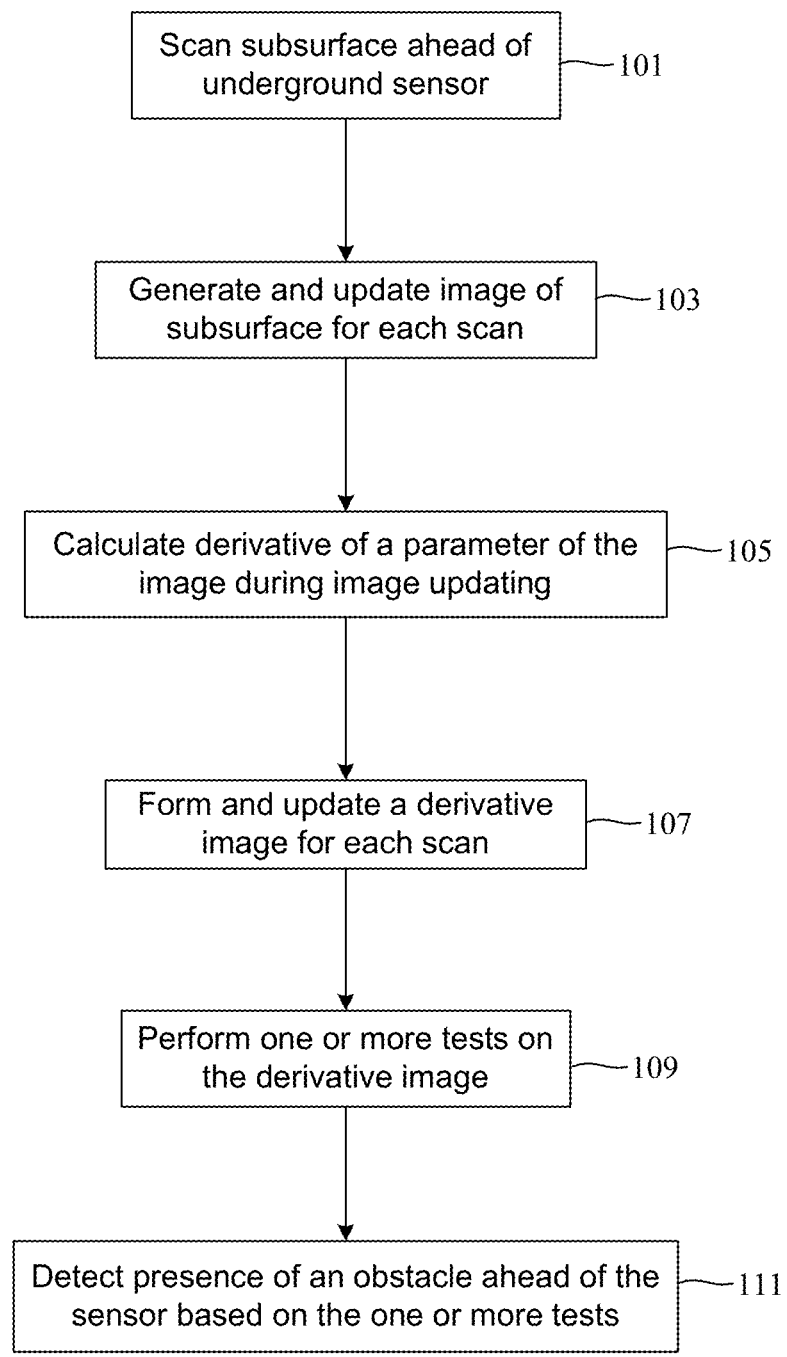
FIGS. 1 and 2 show various processes of derivative imaging algorithms in accordance with various embodiments.

In the following description of the illustrated embodiments, references are made to the accompanying drawings forming a part hereof, and in which are shown by way of illustration, various embodiments by which the invention may be practiced. It is to be understood that other embodiments may be utilized, and structural and functional changes may be made without departing from the scope of the present invention.

Systems, devices or methods according to the present invention may include one or more of the features, structures, methods, or combinations thereof described herein. For example, a device or system may be implemented to include one or more of the advantageous features and/or processes described below. It is intended that such a device or system need not include all of the features described herein, but may be implemented to include selected features that provide for useful structures, systems, and/or functionality.

Embodiments of the invention are directed to systems and methods for automated underground obstacle detection using derivative imaging. Embodiments of the invention include derivative imaging systems that can be implemented as stand-alone systems for surveying a subsurface for the presence of buried objects, such as utilities and manmade or natural obstacles. In accordance with various stand-alone system embodiments, derivative imaging of a subsurface may be performed in real time, providing immediate underground object detection information while scanning or surveying the subsurface. In accordance with other stand-alone system embodiments, derivative imaging of a subsurface may be performed subsequent to scanning or surveying the subsurface using data acquired during subsurface scanning or surveying.

Embodiments of the invention include derivative imaging systems that can be incorporated into excavation machinery for surveying a subsurface for the presence of buried objects prior to or during excavation. Embodiments of the invention include underground obstacle detection and pre-collision warning systems, which are preferably implemented for real time operation and find particular usefulness when incorporated into excavation equipment, such as horizontal directional drilling machines. Other system implementations that incorporate derivative imaging in accordance with the present invention are contemplated. For example, many of the embodiments disclosed herein are directed to sensors that are adapted for use or deployment underground, such as in a boring tool of an HDD machine system. Other embodiments are directed to sensors that are adapted for use at or above ground level, such as surface ground penetrating radar systems.

Underground obstacle detection using derivate imaging in accordance with the present invention involves acquiring data from a sensor configured for subsurface sensing. The data acquired from the sensor, which is typically pre-processed, is used to generate an image of the subsurface. This subsurface image is "built up" by incorporating additional data acquired from the sensor into the subsurface image, which progressively improves the resolution or information density of the subsurface image. The subsurface image changes and evolves as newly acquired sensor data is added. A derivate imaging algorithm implemented by a processor or other electronic circuitry operates on the subsurface image by calculating the derivative of a parameter of the subsurface image. A derivative image is formed using the derivatives of the parameter, and one or more tests are performed on the derivative image. An output is generated indicating presence of a subsurface obstacle proximate the underground sensor based on the one or more tests.

A wide variety of sensors may be employed in systems that implement derivative imaging in accordance with the present invention. In general, suitable sensors include those that can sense for presence of an object in proximity, but not in contact, with the sensor, which allows for pre-collision detection of the object. Particularly useful sensors include those that generate a probe signal and sense for a reflected or return signal. The following is a non-exhaustive, non-limiting list of representative sensors that may be adapted for underground object detection using derivative imaging in accordance with embodiments of the invention: a radar sensor such as a ground penetrating radar, an acoustic sensor, a seismic sensor, an electromagnetic sensor, a magnetic field sensor, a magnetic resonance (MRI) sensor, a positron emission (PET) sensor, a nuclear magnetic resonance (NMR) sensor, a time-domain electromagnetic (TDEM) sensor, a resistivity sensor, a permittivity sensor, a conductivity sensor, a thermal sensor, a capacitance sensor, a magnetic field sensor (e.g., magnetometer), and a chemical sensor.

In various embodiments, a single sensor system is employed for underground object detection using derivative imaging in accordance with the invention. In other embodiments, two or more disparate sensor system are employed for underground object detection using derivative imaging. In some embodiments, disparate sensor systems are employed to provide independent underground object detection information. In other embodiments, disparate sensor systems are employed to provide composite underground object detection information, such as by using one or more fusion algorithms.

Fusion can be implemented at one or several stages during sensor data processing and derivative imaging. In one approach, for example, a derivative image can be formed and a feature derived using data acquired from each of the disparate sensors independently, followed by a feature level fusion. In another approach, a subsurface image can be jointly formed using fused sensor data in a data level fusion, and a derivative image can be generated from this subsurface image. Fusion can be implemented at any step in the formation of the derivative image, from acquisition of the raw sensor data prior to formation of the derivative image, to fusing the derivative images and identifying objects (targets) in the fused image, to forming derivative images of individual subsurface images and then fusing the targets identified from each of those derivative images. Additional details for performing fusion in the context of various embodiments of the invention are disclosed in U.S. Pat. Nos. 6,751,553 and 5,321,613, which are incorporated herein by reference.

Embodiments of the invention are directed to methods of automated subsurface obstacle detection which involve scanning a subsurface proximate an underground sensor and generating an image of the subsurface using a first subsurface scan. The subsurface image is updated using subsurface scans subsequent to the first scan. A derivative of a parameter of the updated subsurface image is calculated, and a derivative image is formed using derivatives of the parameter. One or more tests are performed on the derivative image, and an output is generated indicating presence of a subsurface obstacle proximate the underground sensor based on the one or more tests.

The parameter for which derivatives are calculated is preferably a reflected or scattered energy parameter associated with an element or region of the subsurface image. For example, the parameter may be brightness of a pixel of the subsurface image. By way of further example, the parameter may be brightness of a cluster of pixels of the subsurface image. Forming the derivative image typically involves calculating the derivative of the brightness of each pixel or each cluster of pixels of the subsurface image to form the derivative image.

In some embodiments, forming the derivative image involves forming a first derivative image using first derivatives of the parameter. In other embodiments, forming the derivative image involves forming a higher order derivative image using higher order derivatives of the parameter, such as second derivatives of the parameter. One or more tests are performed on the first or higher order derivative image, and an output is generated indicating presence of a subsurface obstacle proximate the underground sensor based on the one or more tests. In further embodiments, first and second derivative images may be formed using first and second derivatives of the parameter. One or more tests are performed on each of the first and second order derivative images, and an output is generated indicating presence of a subsurface obstacle proximate the underground sensor based on the one or more tests.

It is understood that higher order derivatives, even beyond the second derivative, can be used for derivative imaging object detection in accordance with embodiments of the invention. In some embodiments, one or more tests can involve an algorithm that combines the values of derivatives of different order in some complex fashion. An example of this would be to use the first derivative detection methodology presented herein, including the tests described, but also include an additional test that requires the second derivative to have some value as well in order to accept the first derivative at a particular stage. As another example, a weighted product of the first and second derivatives may be tested for a certain value to indicate detection. It does happen that the first derivative is positive, while the second derivative is negative (the second derivative can be thought of as the curvature of the function in question), indicating that, although the change in the function is still increasing, the rate of increase is decreasing. This can be a useful test. For example, tests that use an algorithm that combines the values of derivatives of different order can improve detection specificity.

In accordance with various embodiments, a derivative imaging algorithm of the present invention includes one or more parameters that can be adjusted to tune algorithm performance. These parameters may be adjusted based on a number of factors, including geology of the subsurface (e.g., sand vs. clay), water content, rate of sensor displacement, object detection range and depth requirements, object detection sensitivity vs. selectivity (specificity) requirements, tolerance or accuracy requirements of the detection information, and detection radius or field of view (FOV) requirements, among others.

In various embodiments, detection radius represents a parameter of the derivative imaging algorithm that can be adjusted, either automatically or with user input. The detection radius parameter establishes the detection range of the sensor (e.g., field of view). A sensor used for object detection in accordance with the present invention is preferably implemented for sensing ahead and lateral of the sensor. The detection radius parameter establishes a detection zone extending ahead and lateral of the sensor whose size is dictated by the magnitude of the detection radius parameter. The shape of the detection zone may also be adjusted using the detection radius parameter and/or other parameter (e.g., a detection zone shaping parameter, such as a parameter that influences the shape of a down-hole radar's radiation pattern). Limiting the detection radius to a reasonable size in view of particular surveying conditions is recommended for achieving optimal object detection performance.

Selecting a detection radius of 6 feet, for example, causes the derivative imaging algorithm to ignore subsurface features further than 6 ft away from the sensor that would otherwise be identified by the algorithm as likely obstacles. The range of detection radii depends largely on the type of sensor employed and other factors, such as those listed above, with typical detection radii ranging between less than 1 ft to at least 20 ft.

Selecting a detection radius that is too small for a particular survey reduces the size of the sensor's detection zone (i.e., reduces the sensor's range of sensitivity), thus limiting how far beyond the sensor objects of interest can be detected. This scenario can result in little or no pre-collision warning (and little or no time to take corrective action) if the rate of sensor displacement is high relative to the sensor's range of sensitivity. Reducing the detection radius, however, does increase the selectivity/specificity of object detection, thereby reducing the likelihood of false positives.

Selecting a detection radius that is too large for a particular survey increases the size of the sensor's detection zone, which can have the negative result of detecting objects of little or no concern that pose no threat for collision avoidance purposes. Increasing the sensor's detection radius increases the computational burden on the sensor electronics, signal processing and data communication circuitry, and the detection algorithm processor, which is wasteful when much of the processed information is ignored or discarded for purposes of object collision avoidance. Increasing the detection radius, however, does increase the sensor's sensitivity to sense objects well ahead or lateral of the sensor, but has the negative effect of reducing the selectivity/specificity of object detection, thereby increasing the likelihood of false positives.

Another parameter of the derivative imaging algorithm that can be adjusted is a first threshold against which the derivative of each parameter (e.g. pixel brightness) is tested. For example, the derivative of the brightness of each pixel or pixel cluster is compared to the first threshold. The first threshold is preferably a positive number equal to or greater than 1, which indicates that pixel brightness is increasing for successive scans by roughly the same magnitude. The first threshold may be set to a positive number that is less than 1, to account for presence of noise and clutter, for example.

This first threshold is used to cut off parts of the derivative image that are not significant. This is done by applying the first threshold without binarizing the image. In other words, the pixel values below the first threshold are set=0, but other values are kept the same as they were before the first thresholding comparison operation. Thresholding with binarization can also be used, but other changes in the settings and equations in the derivative imaging algorithm would need to be adjusted accordingly, as one skilled in the art would appreciate.

In one representative embodiment, the value of the first threshold is set to 0.7. In general, a pixel brightness derivative value>1 is not to be expected, as this would indicate that the brightness of the pixel is increasing the same amount with each added scan. Setting this first threshold to 1 or greater would appear to be too stringent (based on experiments so far), but this is where a second derivative test is of particular value. For example, if the rate of change of a pixel value (first derivative) actually increases as scans are added over a number of scans (meaning the second derivative is >0), then this is a good indication that something real (e.g., an obstacle) is present in the sensor's field of view.

Another parameter of the derivative imaging algorithm that can be adjusted is a second threshold that impacts the sensitivity (and selectivity or specificity) of the detection algorithm. The second threshold is preferably set to allow for detection of changes in the derivative image as it is updated and evolves with the addition of new sensor information with sufficient speed to maintain real time subsurface object detection. The second threshold may be a value that represents a minimum change (e.g., percent change) in the last n derivatives of the brightness of a particular pixel that is required to constitute a likely detection event, where n is an integer.

The second threshold determines if a pixel in the derivative image (not the actual data image of the subsurface) is to be considered a detection event, and, as will be described in detail hereinbelow, whether a marker is added to a marker mask (which is also a 2-D array or an "image") by the derivative imaging algorithm. The value of the second threshold is typically set and adjusted based on a number of factors, including the values of n (i.e., the last "n" derivatives) and the value of the first threshold. The value of n can generally vary between 1 and 20, and typically varies from 5 to 15. In general, smaller values of n provide for an increase in the sensitivity of the detection algorithm, with a concomitant reduction in selectivity/specificity and increase in the likelihood of false positives.

In one representative example, the value of n is set to 10, meaning that a series of 10 consecutive derivatives greater than the value of first threshold (set at 0.7) are required for a detection. The second threshold is set to 10, and is used for thresholding with binarization, which means that all pixels in the derivative image above the second threshold are set=1, while all those below the threshold are set=0. The value of this second threshold is tied intimately to the number, n, of images used in the detection decision, as well as to the value of the first threshold. Recall that the first threshold in this representative example is set to 0.7 and applied as thresholding without binarization, so the second threshold determines if the sum of the series of n derivative images, at a particular location, is greater than 10 (or having an average value for the 10 images of >1 in this case).

In this representative example, the value of the second threshold=n, but this does not necessarily have to be the case, and the choices of the first threshold, the second threshold, and n work together to determine the sensitivity and specificity of the derivative imaging algorithm.

In some embodiments, each of the first threshold, the second threshold, and n parameters are selectable. In other embodiments, only a sub-set of the first threshold, the second threshold, and n parameters are selectable. In further embodiments, a sub-set of the first threshold, the second threshold, and n parameters are fixed after performing necessary calibration and unalterable thereafter until a subsequent calibration is performed. Some or all of the first threshold, the second threshold, and n parameters may be selectable by an operator, automatically by a processor implementing the derivative imaging algorithm based on various inputs, or semi-automatically with input from the operator.

According to other embodiments, a single control (e.g., user control knob) can be implemented that selects each of the first threshold, the second threshold, and n parameters for different types of soil or excavation (e.g., HDD) conditions. For example, moving the control knob or other type of switch by the operator to different discrete positions can result in setting each of the first threshold, the second threshold, and n parameters to predetermined values associated with the different discrete switch positions (or switch selections).

By way of further example, an analog adjustment approach may be used for adjusting the first threshold, the second threshold, and n parameters. Rather than setting these parameters to predetermined discrete values based on discrete switch positions (or switch selections), movement of the control switch or switches can cause these parameters to change incrementally in a continuous manner. Discrete and analog switch selection approaches can be combined to provide an operator with the ability to make course changes (via discrete switch position selection) and fine changes (via incremental continuous switch position adjustment) in these parameters (all or a sub-set of the first threshold, the second threshold, and n parameters).

In some embodiments, one or more sensors of the system may be used to evaluate the one or more soil and/or excavation characteristics. The sensor(s) used for this evaluation may be the same or different sensor(s) that is/are used for object detection. For example, a GPR can be used to determine various characteristics of the soil, and a processor-implemented evaluation of these soil characteristics can result in automatic or semi-automatic selection or adjustment (e.g., dynamically with changing soil/excavation conditions) of all or a sub-set of the first threshold, the second threshold, and n parameters. Additional details about characterizing subsurface geology that can be incorporated in a control methodology and system for setting and adjusting one or more parameters of a derivative imaging algorithm of the present invention are disclosed in commonly owned U.S. Pat. No. 6,701,647, which is incorporated herein by reference.

Each pixel of the derivative image may be tested for specific conditions relating to the reasonableness of other aspects of the pixel or pixel cluster. For example, each pixel or pixel cluster can be tested to determine if the range associated with each pixel or pixel cluster is less than a detection depth of the sensor. If the range is determined to be beyond the detection depth, this pixel or pixel cluster information is considered unreliable and is ignored for purposes of determining whether or not a detection event has occurred. Each pixel or pixel cluster can be tested to determine if the location associated with each pixel or pixel cluster is beyond the position of the sensor. If the position is determined to be behind the sensor position, this pixel or pixel cluster information is considered unreliable and is ignored for purposes of determining whether or not a detection event has occurred.

In some embodiments, the derivative imaging algorithm is implemented to allow for adjustment of the detection radius and the first and second thresholds described above. In other embodiments, the derivative imaging algorithm is implemented to allow for adjustment of the detection radius, the first and second thresholds, and pixel range testing. In further embodiments, the derivative imaging algorithm is implemented to allow for adjustment of the detection radius, the first and second thresholds, pixel range testing, and pixel location testing.

Turning now to FIG. 1, there is illustrated various processes of a derivative imaging algorithm in accordance with embodiments of the invention. According to FIG. 1, derivative imaging involves use of an underground sensor to scan 101 ahead, and preferably lateral, of the underground sensor. An image of the subsurface is generated and updated 103 for each scan. A derivative of a parameter of the image is calculated 105. A derivative image is formed and updated 107 for each scan. One or more tests are performed 109 on the derivative image. Presence of an obstacle ahead or lateral of the sensor is detected 111 based on the one or more tests.

According to various embodiments, the derivative imaging algorithm generates and performs processing on at least two images; a data image (i.e., an image of the subsurface), and a derivative image. One or more tests are performed on the derivative image to detect the presence of a subsurface object. An indicator of the presence of the object (e.g., marker or tag), as determined from the algorithm operating on the derivative image, is then placed on the processed data image. The derivative image is generally hidden from the user and is an internal component of the derivative imaging algorithm.

According to embodiments that involve SAR reconstruction, the data image is the SAR reconstruction, which is an image of what is in the soil. Markers indicative of detection events are placed on this SAR image so that the operator or a processor can understand where in subsurface space the detection has occurred.

Figure 2:
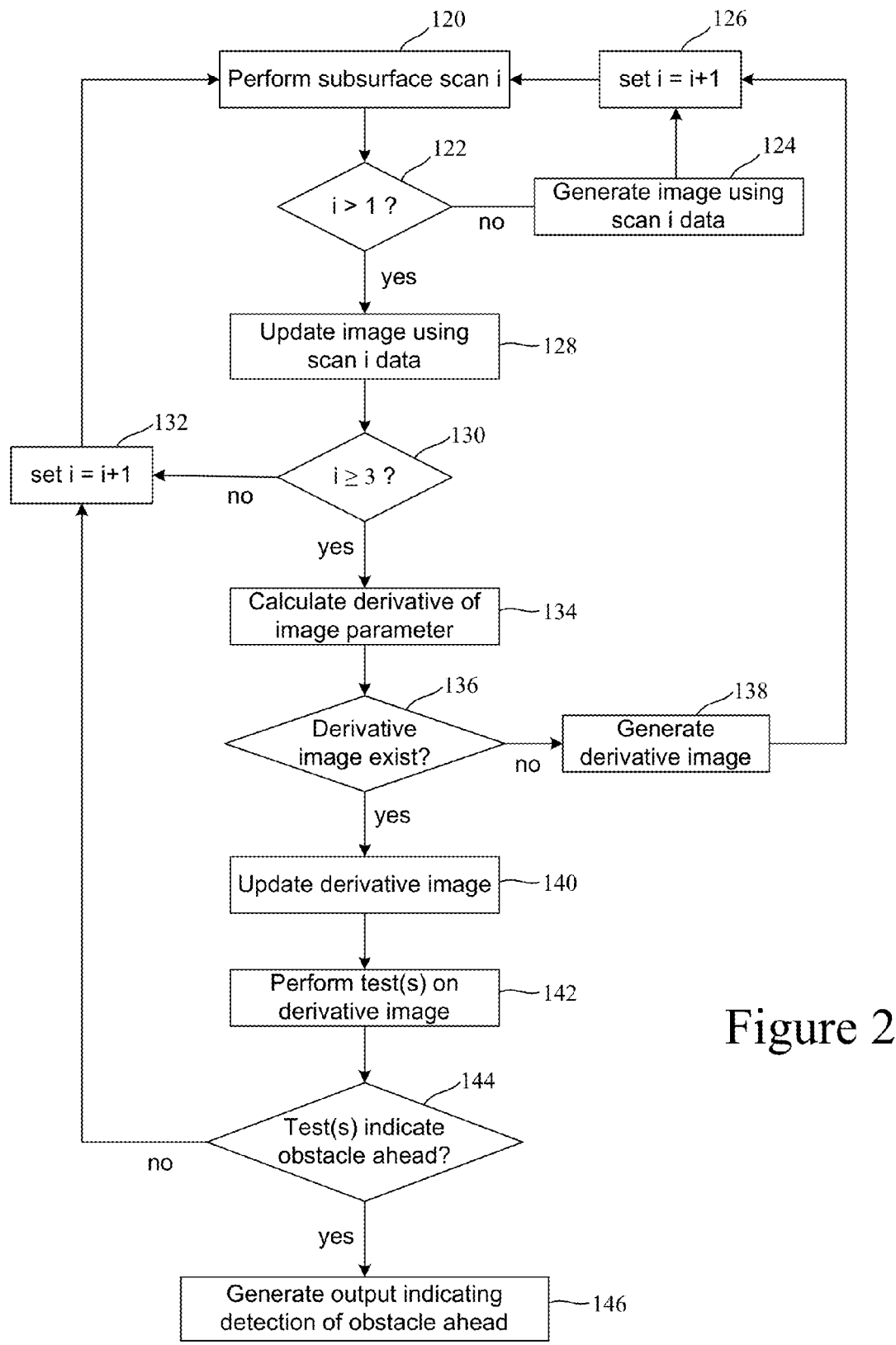

FIG. 2 illustrates various processes of a derivative imaging algorithm in accordance with embodiments of the invention. According to FIG. 2, derivative imaging involves use of an underground sensor to perform 120 a subsurface scan i, where i is an integer. A check is made at block 122 to determine if i>1. If not, then the current scan is the first scan, and an image is generated 124 using the scan i data. The value of i is set to i+1 at block 126. If it is determined at block 122 that i>1, then the current image is updated 128 using the scan i data. A check is made at block 130 to determine if scan i≥3, which is a test for the minimum number of scans required to perform a derivative calculation. If not, then the value of i is set to i+1 at block 132 and control returns to block 120.

If it is determined at block 130 that scan i≥3, then a derivative of an image parameter (e.g., image pixel brightness) is calculated 134. A check is made at block 136 to determine if a derivative image exists. If not, then a derivative image is generated 138, i is set to i+1 at block 126, and control returns to block 120.

If it is determined at block 136 that a derivative image exists, then the current derivative image is updated 140 using the calculated derivative. One or more tests are performed 142 on the derivative image. If the one or more tests indicate presence of an obstacle ahead or lateral of the sensor, as tested at block 144, then an output is generated 146 indicating detection of the obstacle. Otherwise, i is set to i+1 at block 132, and control returns to block 120. The processes shown in FIG. 2 are preferably performed on a pixel-by-pixel basis (or pixel cluster-by-pixel cluster basis) for each scan.

FIGS. 3-8 illustrate synthetic aperture radar images with the results of the derivative imaging object detection algorithm superimposed as rectangular markers. In FIGS. 3-8, data was acquired from a radar sensor package mounted to a drill head proximal of the drill head spade. The radar sensor data used to construct the plots shown in FIGS. 3-8 were acquired with the drill head moving longitudinally without being rotated.

In FIGS. 3-8, the x-axis represents the distance (in feet) the drill head has travelled forward relative to the driving source (e.g., HDD machine). Actual longitudinal displacement of the drill head can be measured using an encoder mounted on the HDD machine, by a displacement sensor (e.g., accelerometer or gyro) provided at the drill head, or by use of an above-ground locator or tracker, for example. According to one approach, drill head advance can be measured with a calibrated linear encoder and rotation angle can be measured using a MEMS roll sensor incorporated into the transmitter board of the radar sensor. The y-axis represents the distance (in feet) from the drill bore axis. A y-axis value of 0 ft represents the drill bore itself. Increasing y values indicate increasing distances from the bore.

The images of FIGS. 3-8 show a radial slice extending through a cylinder surrounding the bore. The slice extends from the center of the cylinder (bore axis) radially outward to at least the selected detection radius that defines the sensor's field of view. This slice is also oriented at a particular azimuthal angle. For example, a particular slice may range from zero distance from the bore to 6 ft from the bore, in a direction at 180 degrees vertically down (or at an azimuthal angle of 90 degrees, or any other angle).

The SAR images shown in FIGS. 3-8 were computed at a single azimuthal angle. This was done for these data because the data were collected with the drill head being longitudinally displaced without rotation. Thus, only one azimuthal angle was sampled in these data. The derivative image is calculated in the background, and when an object is detected by that algorithm, a marker is placed on the SAR image itself. As such, the images of FIGS. 3-8 are SAR images with an object marker inserted where the derivative image algorithm has determined that an object exists, or where the algorithm has determined that its criteria for the existence of an object ahead of the drill head have been met.

To look in all directions, a full 3-D SAR image (or image in 3-D of any of the other sensor data) is computed and the derivative image in 3-D space calculated. One approach involves computing a series of radial slices at varying azimuthal angles around the bore (like spokes on a wheel), so that the operator or processor can tell or compute not only the distance of the object is from the bore, but also the azimuthal direction to that object. A more detailed discussion of a full 3-D SAR derivative imaging approach in accordance with embodiments of the invention is provided hereinbelow with reference to FIGS. 17-23.

Figure 4:
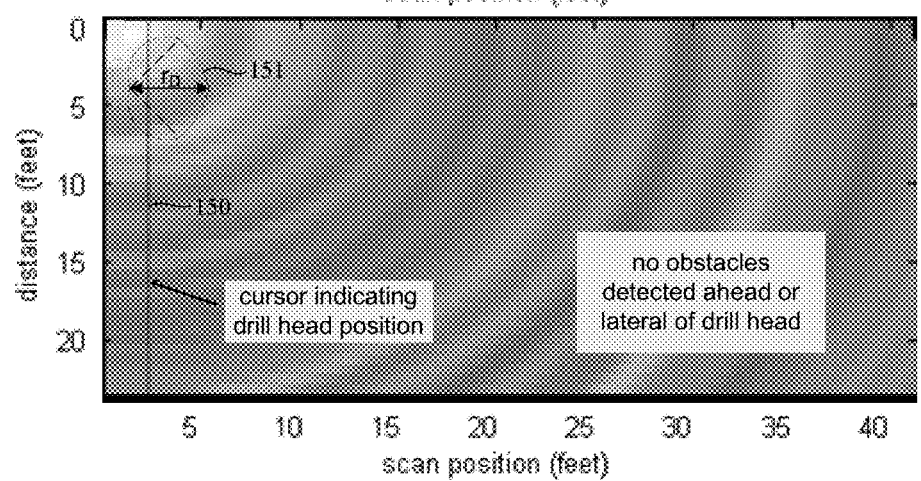
FIG. 4 shows the additive effect of updating the SAR image of FIG. 3 with SAR image data for each successive scan, resulting in an image with much higher resolution in accordance with various embodiments.
Figure 5:
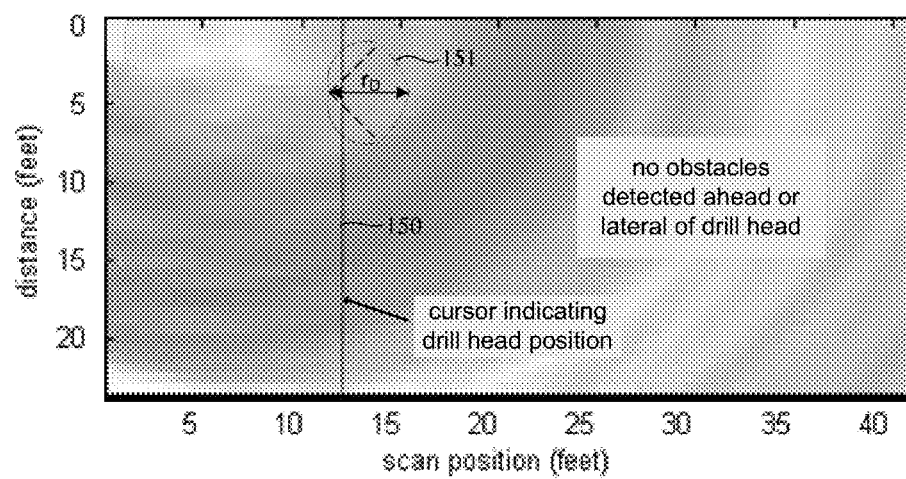
FIG. 5 shows the frame just prior to detection of a pre-installed subsurface object relative to a drill head advancing through the subsurface in accordance with various embodiments.
Figure 6:
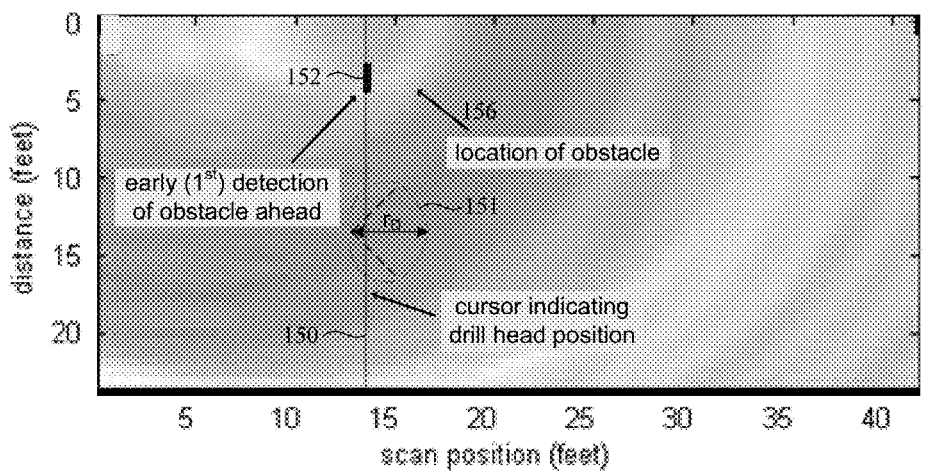
FIGS. 6-8 illustrate an example of a mask image applied to a SAR image in accordance with various embodiments.
Figure 7:
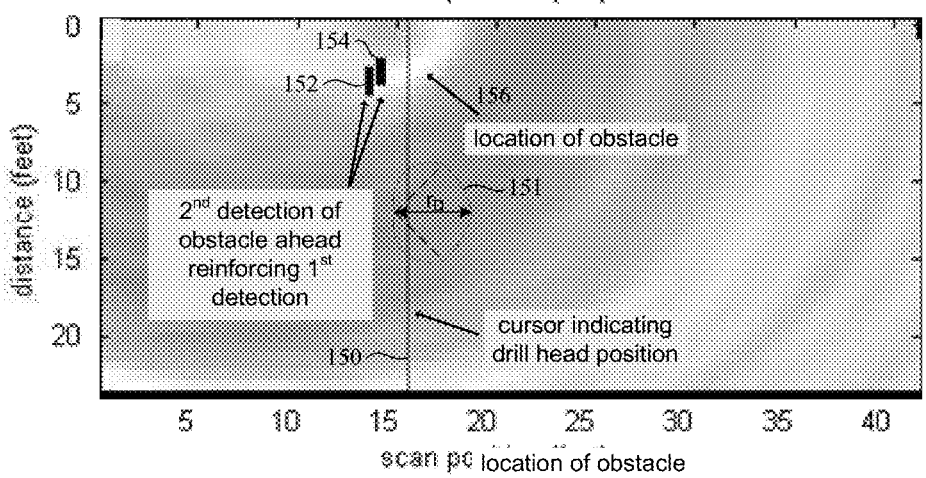
Figure 8:
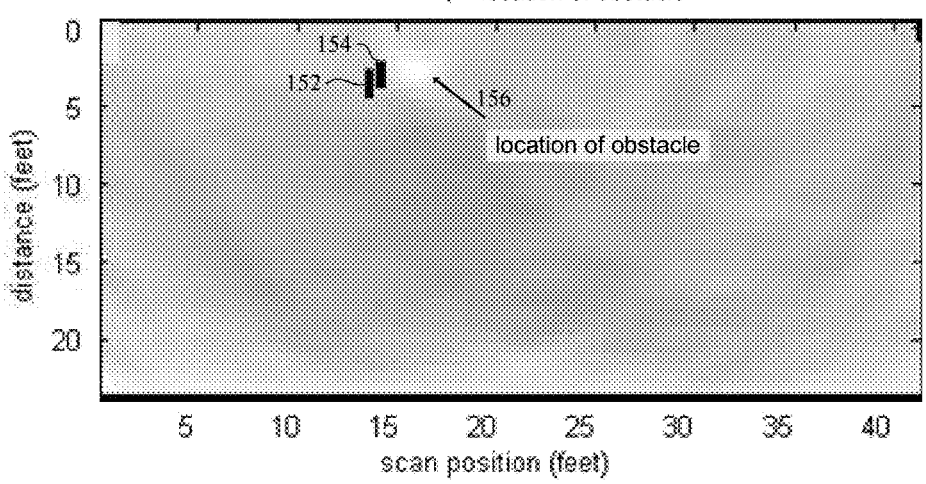

The rectangular markers shown in FIGS. 6-8 represent a detection event that occurs prior to the sensor reaching the obstacle. The vertical line 150 shown in FIGS. 4-8 is a cursor that indicates the position of the drill head as it progresses along an underground path that originates at a zero reference of the x-axis and extends along the positive x-axis (i.e., the cursor moves from left to right corresponding to longitudinal drill head advancement relative to the driving source (e.g., HDD machine)). A detection zone 151 of the sensor is illustrated as having a detection radius, $r_D$, which in this illustrative example is about 4.6 ft. It is understood that the shape of the detection zone is for illustrative purposes only, and can be designed to assume a desired shape about the sensor. It is noted that the detection zone 151 is shown to originate slightly behind the drill head, since the sensor package is typically mounted behind (proximal of) the drill spade.

Figure 3:
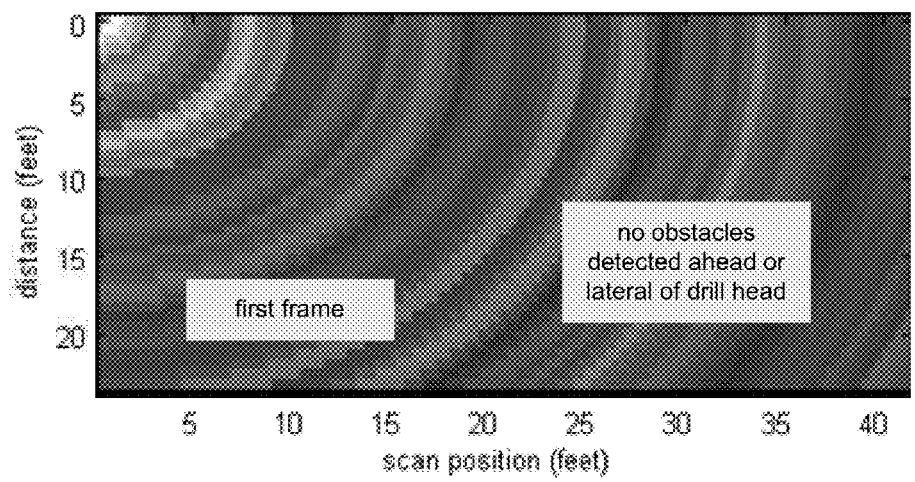
FIG. 3 shows a first frame of a dynamic SAR image reconstructed from raw radar return data resulting from a first scan of a subsurface in accordance with various embodiments.

FIG. 3 is a first frame of a dynamic SAR image reconstructed from raw radar return data resulting from a first scan of the test subsurface. As can be seen in FIG. 3, the first frame of the SAR image is of relatively poor resolution. This first frame, however, represents the initial subsurface image to which additional SAR image data is added by each successive scan of the subsurface. FIG. 4, for example, clearly demonstrates the additive effect of updating the SAR image of FIG. 3 with SAR image data for each successive scan, resulting in an image with much higher resolution (increased information density).

In FIG. 4, cursor 150 shows the longitudinal progression of the drill head relative the driving source as the drill head advances toward a pre-installed target location about 16 ft ahead of the zero reference of the x-axis. In this illustrative scenario, the detection radius is set to about 4.6 ft, meaning that objects that would be identified by the detection algorithm as likely obstacles further than 4.6 ft from the sensor are ignored. In FIG. 4, the location of the drill head, as shown by cursor 150, is about 2.5 ft from its initial location (i.e., the zero reference of the x-axis). Because the pre-installed obstacle is well ahead of the drill head sensor and beyond the sensor's detection zone 151, presence of the pre-installed target is not detected (i.e., 16 ft−2.5 ft=13.5 ft (distance between sensor and target)−4.6 ft (detection radius)−1 foot (setback from drill spade)=about 7.9 ft, which is about 8.1 ft beyond the sensor's detection zone).

In FIG. 5, the drill head has advanced to about 13 ft from the origin, as indicated by the cursor 150. In FIG. 5, the pre-installed target may either be close to or slightly within the sensor's detection zone 151. Because either the pre-installed obstacle is still slightly ahead of the drill head sensor or less than 3 scans of data have been acquired with the drill head falling within the detection zone 151, presence of the pre-installed target is not detected. In this particular case, the image shown in FIG. 5 is the frame just prior to detection of the pre-installed obstacle (e.g., scan 2 of a minimum of 3 scans needed to calculate pixel brightness derivatives and perform pre-collision detection of the pre-installed obstacle located ahead of the drill head).

FIGS. 6-8 illustrate an example of a mask image applied to a SAR image. For each of these figures, a tag or other marker has been added to a target detection mask after each scan if a positive indication of object detection has occurred. In some embodiments, the SAR image may be cropped to exclude image data for a region beyond a certain distance in front of or to the sides of the drill head. The target detection mask is preferably the same size as the cropped SAR image and is applied to the cropped SAR image. The processor implementing the derivative imaging object detection algorithm may perform an action based on the generation or application of a marker. If only one marker is applied, for example, then the processor may issue a warning to the operator of the imaging system (e.g., an HDD machine operator via a human-machine interface). The processor of an HDD machine, by way of further example, could stop the drill if more than one marker was applied and/or at least one marker was close in proximity to at least one other marker, for example. The more markers that are present and the denser the markers are, the more confidence the processor has in making a correct object detection.

FIG. 6 shows a first detection event that occurs at about 13.5 ft from the origin, which is about 2.5 ft ahead of the pre-installed obstacle located at 16 ft from the origin. This first detection event is indicated by the rectangular marker 152. FIG. 7 shows a second detection event that occurs at about 14 ft from the origin, which is about 2 ft ahead of the pre-installed obstacle. This second detection event is indicated by the rectangular marker 154. As is discussed above, reconstructed SAR image data is continuously added to the composite SAR image on a scan-by-scan basis, which continuously improves the resolution of the composite SAR image, as can clearly be seen in FIGS. 3-8. The second and any subsequent detection events are indicated by additional markers, which serve to reinforce or confirm the reliability of the first detection event. FIG. 8 shows a marked SAR image showing all detection events for possible obstacles that were identified by the derivative imaging object detection algorithm. In particular, FIG. 8 shows the last frame of the updated SAR image with markers from the derivative image object detection algorithm superimposed thereon.

In response to a detection event or n events, various actions may occur. For example, a human perceivable warning may be generated in response to a first detection event, and different warnings of varying intensity or character may be generated in response to each subsequent detection event. An early warning algorithm executed by a processor of the HDD machine, for example, may generate a warning light and/or audible alarm in response to a detection event. The warning may prompt the operator to take corrective action to avoid a collision between the drill head and the detected obstacle located ahead of the drill head. If no or insufficient corrective action is taken, such as halting or changing direction or displacement rate of the drill head, the early warning algorithm may automatically slow the drill displacement rate or halt advancement of the drill head. In a conservative implementation, the control protocol may simply halt movement of the drill head in response to the first detection event.

A tiered set of HDD machine control protocols can be programmed and executed by the processor for automatically intervening in HDD operations in response to successive detection events. The level of automatic corrective action intervention made by the HDD machine controller may increase in response to each successive detection event. For example, in response to a first detection event, a first control protocol can be implemented by the HDD machine controller to slow down the drilling rate, such as by slowing longitudinal displacement of the drill head and, if desired, reduce the rate of drill head rotation. An operator alarm is preferably generated in response to the first detection event. In response to a second detection event, more aggressive intervention is taken by the HDD machine controller in accordance with a second control protocol, such as by disabling drill head movement and generating an alarm of increased intensity. Other control scenarios are contemplated.

Actual longitudinal displacement of the drill head can be measured using a linear encoder mounted on the HDD machine, by a displacement sensor (e.g., accelerometer or gyro) provided at the drill head, or by use of an above-ground locator or tracker. Drill head rotation can be measured by these and other sensors, such as a MEMS roll sensor incorporated into the radar sensor electronics. Additional details of drill head displacement and rotation measuring methodologies, systems, and devices that can provide drill head positioning and rotation data for use by a derivative imaging algorithm of the present invention are disclosed in commonly owned U.S. Pat. Nos. 7,607,494, 6,755,263, and 7,182,151, all of which are incorporated herein by reference.

Reference will now be made to FIGS. 17-23, which are provided to enhance an appreciation of various physical, geometric, and other factors that are dealt with when performing 3-D subsurface derivative imaging in accordance with embodiments of the invention. These factors are of particular interest when performing 3-D subsurface object detection using a sensor that is both displaced longitudinally and rotated as it is moved through the ground.

Figure 17:
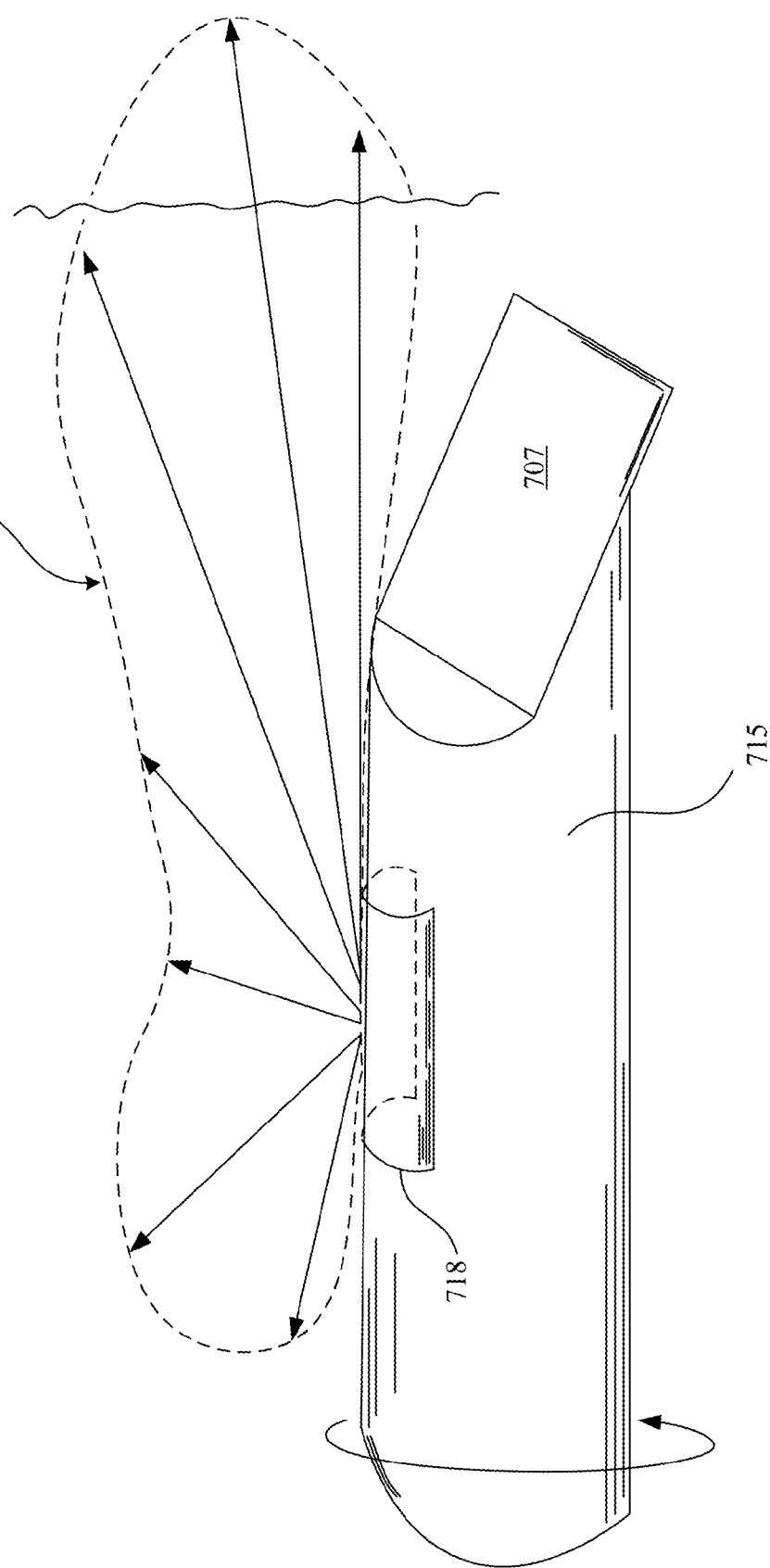
FIG. 17 shows a cutting tool comprising a sensor package which includes a radar sensor, and further shows a radiation pattern of the drill head radar in accordance with various embodiments.

FIG. 17 shows an embodiments of a cutting tool configured to displace earth as it is forcibly moved through a subsurface. For purposes of illustration, one particular cutting tool contemplated in FIG. 17 is a boring tool 712, it being understood that other types of earth penetrating implements are within the scope of the present invention (e.g., pneumatic piercing tools, navigable moles, reamers, etc.).

The boring tool 712 shown in FIG. 17 includes a drill head 715 and a drill spade 707 positioned at a distal end of the drill head 715. A sensor package 718 is mounted in or on the drill head 715 at a location proximal of the drill spade 707. The sensor package 718 may house one or more sensors of similar or disparate type. The sensor package 718 also includes communication electronics and a processing capacity, which can vary in terms of sophistication based on design particulars of the drill head 715. The communication electronics may be configured for some form of wireless communication with an above-ground received (e.g., transceiver), but is preferably configured to communicate with an above-ground system via a wireline link established along a drill string which couples the drill head 715 with a driving source (e.g., an HDD machine).

For example, the wireline link can be realized using a communication protocol that operates over the HomePlug™ wireline interface, which allows for control of the drill head sensor(s) via a human-machine interface. In various embodiments, the electronic components of the boring tool 712 are coupled to a communication medium capable of transmitting power and data between the down-hole sensor hardware and an above-ground source. A suitable communication medium is DCI CableLink®, which is available from Digital Control Incorporated. The CableLink® system is permanently installed into the drill rods of the drill stem so that the mechanical and electrical connections occur automatically when the rods are threaded together.

As previously stated, various types of sensors may be housed in a sensor compartment of the drill head within which the sensor package 718 is situated. Some sensors may include a sensor element that is exposed to earth adjacent the drill head 712, while others are enclosed within the sensor compartment. Useful sensors include any of those listed above, for example, and those disclosed in the U.S. patents that are incorporated herein by reference.

In various embodiments, the sensor package 718 comprises a radar sensor. FIG. 17 shows a radiation pattern 710 of the drill head radar 718 that is dependent on angle and, as such, preferentially detects returns from an angle or range of angles. The size and shape of the radiation pattern 710, which defines the radar's detection zone, is largely defined by the antennae design, and may be adjusted using the detection radius parameter and/or other parameter.

Figure 18:
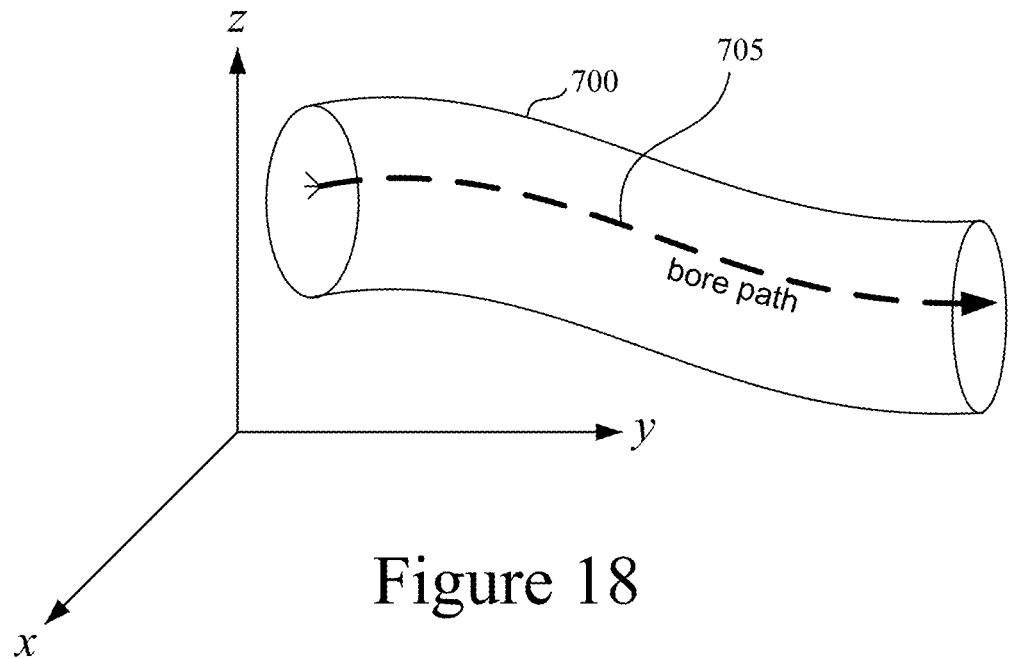
FIG. 18 shows an illustrative cylindrical detection volume defined relative to the central axis of a bore path, the detection volume representing a subsurface volume that is within the detection zone of a drill head radar in accordance with various embodiments.

FIG. 18 shows an illustrative cylindrical detection volume 700 defined relative to the central axis of a bore path 705. This detection volume 700 represents a subsurface volume that is within the detection zone of the drill head radar, noting that the drill head, and therefore the drill head radar, is subject to both longitudinal advancement and rotation when creating a bore.

Figure 19:
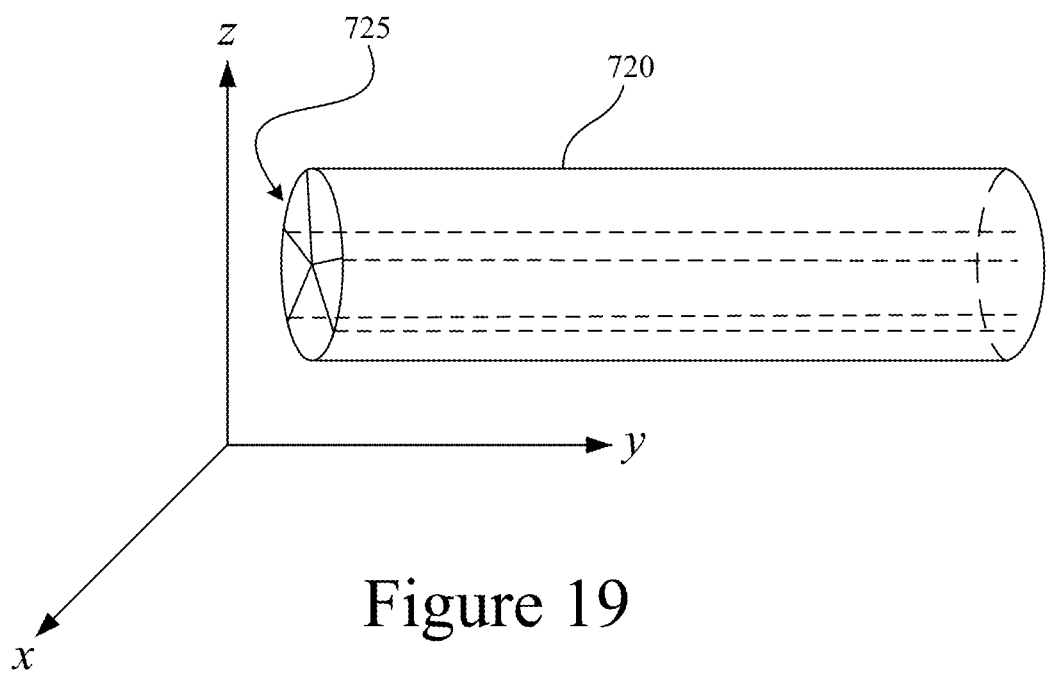
FIGS. 19 and 20 show SAR reconstructions as a series of azimuthal slices in accordance with various embodiments.
Figure 20:
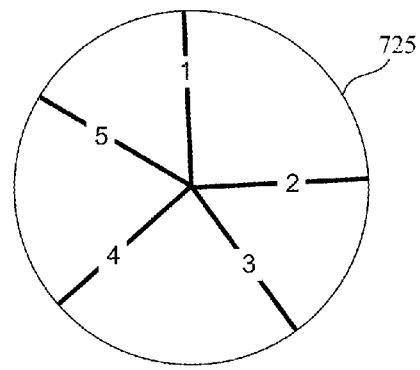

FIG. 19 shows initial SAR reconstructions as a series of azimuthal slices 725. These slices are best shown in FIG. 20. In this illustrative example, FIGS. 19 and 20 show five azimuthal slices (numbered slices 1 through 5) each associated with a different azimuth. It is noted that the periphery of the cylinder 720 represents the limit of the radar sensor's detection zone, and that only fives azimuthal slices are shown for simplicity of explanation.

Figure 21A:
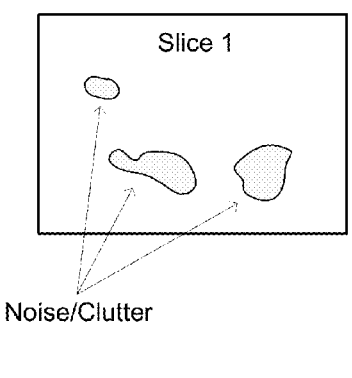
FIGS. 21A-21C are displays associated with azimuth slices 1-3 shown in FIG. 20, the displays showing the output, in graphical form, of a derivative imaging object detection algorithm operating on SAR reconstructions for each azimuthal slice in accordance with various embodiments.
Figure 21B:
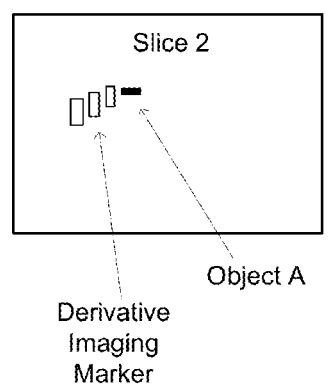
Figure 21C:
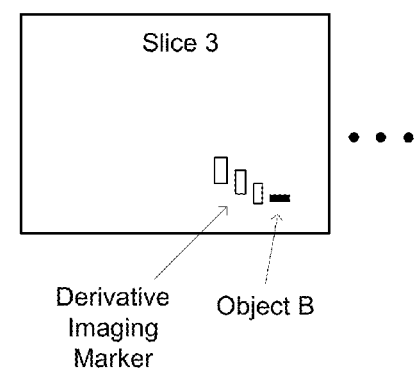

FIGS. 21A-21C are displays associated with azimuth slices 1-3, it being understood that similar displays are generated for azimuth slices 4 and 5. The displays of FIGS. 21A-21C show the output (in graphical form) of the derivative imaging object detection algorithm operating on the SAR reconstructions for each of the azimuthal slices 1-5. In the display shown in FIG. 21A, only noise or clutter data are shown (which can be suppressed to simplify the display). No object ahead of the drill head was detected by the derivative imaging algorithm for azimuthal slice 1.

For the display shown in FIG. 21B, an object ahead of the drill head (Object A) was detected by the derivative imaging algorithm for azimuthal slice 2. In response to each detection event for azimuthal slice 2, the derivative imaging algorithm placed a marker at the appropriate location of the display. For the display shown in FIG. 21C, an object ahead of the drill head (Object B) was detected by the derivative imaging algorithm for azimuthal slice 3. In response to each detection event for azimuthal slice 3, the derivative imaging algorithm placed a marker at the appropriate location of the display.

Although not shown in FIGS. 21A-21C, the derivative imaging algorithm continues to perform object detection for the remaining azimuthal slices 4 and 5, and continues processing of azimuthal slices as the drill head advances longitudinally along the bore path. It is noted that Objects A and B shown in FIGS. 21B and 21C are different because they lie at different azimuths or they are the projections of the same extended linear object projected onto two planes.

Figure 22:
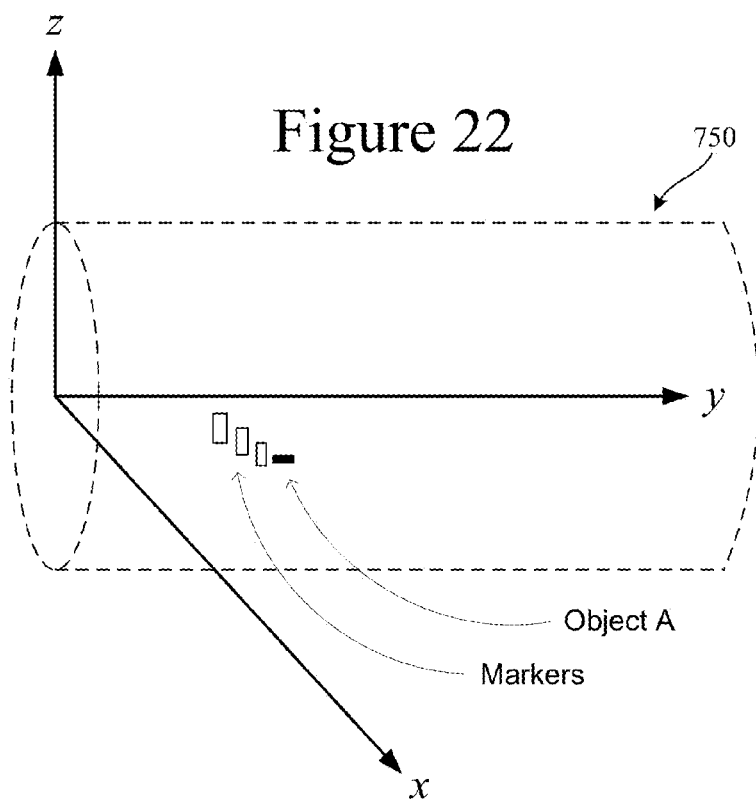
FIG. 22 shows a full 3-D SAR implementation, in which a display may present a 3-D isovolume having 3-D isovolume contours with derivative imaging markers in accordance with various embodiments.
Figure 23:
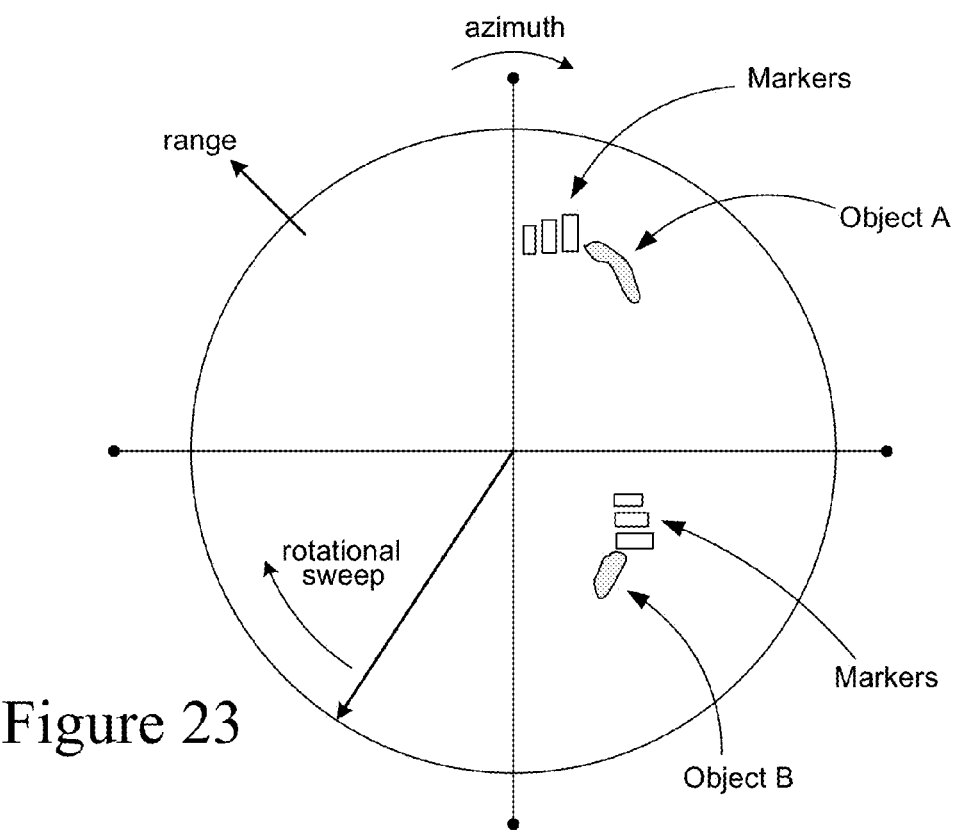
FIG. 23 shows a bombsight view as a bore progresses, the bombsight view showing progressive projections from the cylindrical volume shown in FIG. 22 onto a plane cut normal to the bore axis in accordance with various embodiments.

In a full 3-D SAR implementation, an example of which is shown in FIG. 22, the display may present a 3-D isovolume 750 having 3-D isovolume contours with derivative imaging markers. In addition, as the bore progresses, a bombsight view (similar to those used for weather radars) can show progressive projections from the cylindrical volume 750, onto a plane cut normal to the bore axis. An example of such a bombsight view is shown in FIG. 23, where azimuth is given by angle around the center and the radial dimension is distance form the bore.

Figure 9:
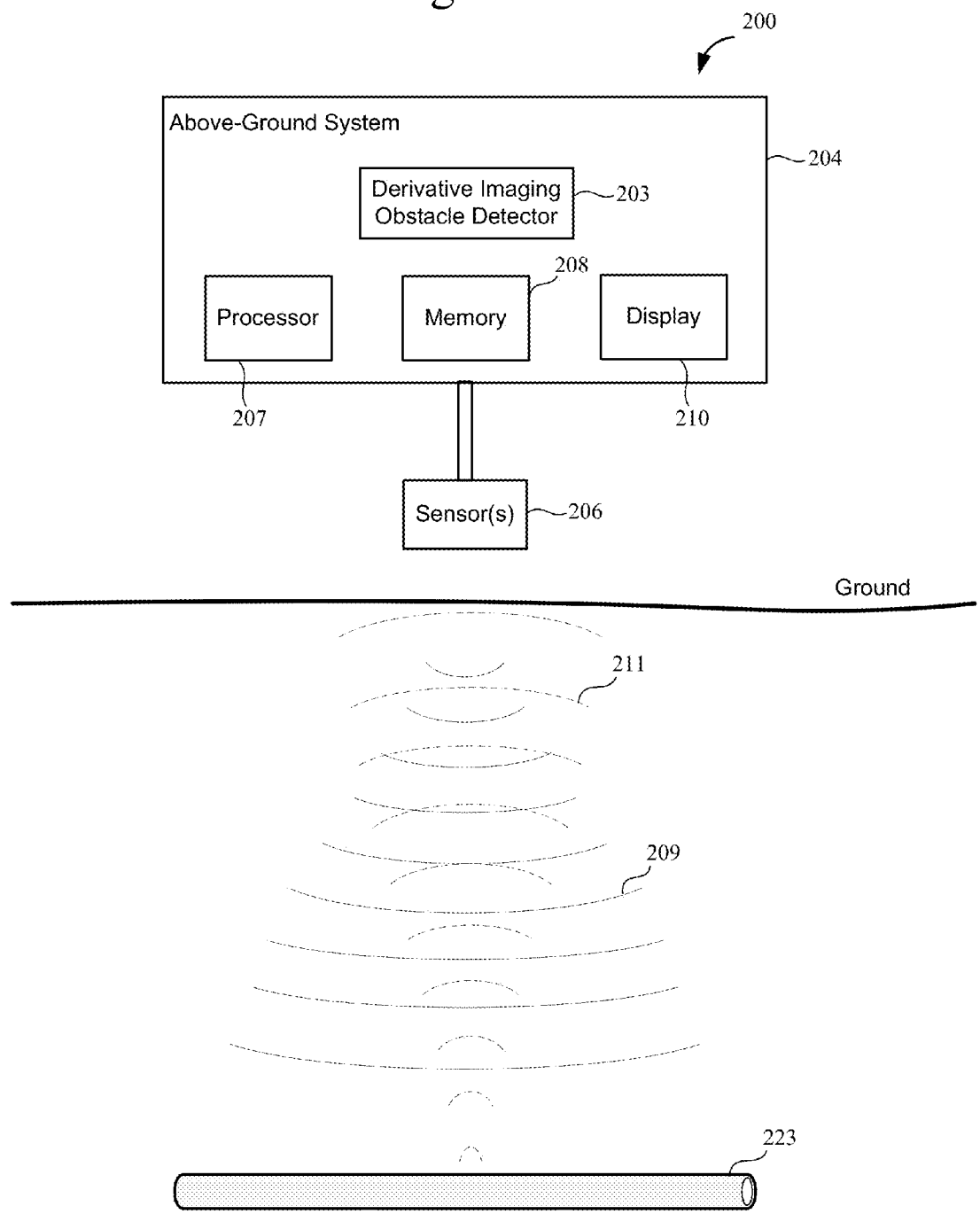
FIG. 9 shows a block diagram of a system for implementing a derivative imaging object detection method in accordance with various embodiments.

Referring back to FIG. 9, this figures shows a block diagram of a system 200 for implementing a derivative imaging object detection method in accordance with embodiments of the present invention. The embodiment shown in FIG. 9 represents a stand-alone system for surveying a subsurface for the presence of buried objects, such as utilities and manmade or natural obstacles. Although shown as a stand-alone system for surveying a subsurface, the system embodiment of FIG. 9 may be used with various excavation equipment, including earth penetrating machinery such as HDD machines and trenchers. For example, the stand-alone system 200 may be used by an operator in advance of the excavation operation to detect presence of buried obstacles ahead of an advancing excavation machine. The stand-alone system 200 may be pulled or pushed by a separate vehicle or mechanism ahead of the excavation machine or by the excavation machine itself, providing real time imaging and detection of buried obstacles ahead of the excavation machine.

The system 200 includes a housing 204 configured for above-ground portability. The system includes a processor 207 coupled to a memory 208 and a display 210. The processor 207 is coupled to a derivative imaging obstacle detector 203, which implements derivative imaging algorithms in accordance with those disclosed herein.

In one configuration, the sensor package 206 is physically and communicatively coupled to the housing 204. In another configuration, the sensor package 206 may be physically separate from the housing 204 but communicatively coupled therewith. A communication link between the housing 204 and the sensor package 206 may be a hardwired or a wireless link.

The system 200 is configured for portability, and may include a transport arrangement (not shown) such as a wheel arrangement or cart. The transport arrangement may be a harness arrangement that allows the operator to carry the system 200 while walking over an area to be scanned. A stabilization arrangement may be provided to attenuate or limit system movement resulting from operator jostling or instability.

The system 200 includes one or more above-ground or surface sensors 206. As was discussed previously, representative above-ground or surface sensors 206 that may be adapted for subsurface object detection using derivative imaging in accordance with embodiments of the invention include a GPR sensor, an acoustic sensor, a seismic sensor, an electromagnetic sensor, a magnetic field sensor, an MRI sensor, a PET sensor, an NMR sensor, a TDEM sensor, a resistivity sensor, a permittivity sensor, a conductivity sensor, a thermal sensor, a capacitance sensor, a magnetic field sensor (e.g., magnetometer), and a chemical sensor.

In the embodiment shown in FIG. 9, the sensor 206 transmits a probe signal 209 that propagates through the subsurface and impinges on or illuminates an underground object, in this case a utility 223. Interaction between the utility 223 and the probe signal 209 results in a return signal 211 that is detected by the sensor 206.

Derivative imaging software is preferably stored in the memory 208 and comprises program instructions executable by the derivative imaging obstacle detector 203 in accordance with derivative imaging algorithms described herein. The derivative imaging obstacle detector 203 operates on the return signals 211 received by the sensor 206. The derivative imaging obstacle detector 203 may be implemented in software, hardware, or a combination of software and hardware. The derivative imaging obstacle detector 203 may be integral to the processor 207 or may be implemented as a component separate from, but communicatively coupled with, the processor 207. Output from the derivative imaging obstacle detector 203 can be presented on the display 210 (see, e.g., images shown in FIGS. 3-8). Output from the derivative imaging obstacle detector 203 can also be communicated (via hardwire or wireless connection) to an external system, such as a PC, PDA, smartphone, network, geographic information system (GIS), or utility mapping system.

In various stand-alone system embodiments, derivative imaging of a subsurface may be performed in real time, providing immediate underground object detection information while scanning or surveying the subsurface. In other stand-alone system embodiments, derivative imaging of a subsurface may be performed subsequent to scanning or surveying the subsurface using data acquired during subsurface scanning or surveying. It is noted that in these and other embodiments, derivate imaging algorithm execution and processing may be performed by an on-board or local processor, or by a remote processor, such as a laptop or network processor.

In accordance with various embodiments of the present invention, a derivative imaging system is incorporated as a component of a horizontal directional drilling machine. HDD machines are used to install utilities underground. Unfortunately, the use of drills in urban environments has the risk of striking and damaging pre-existing utilities. HDD machine embodiments of the present invention employ a radar unit designed to be installed on the HDD drill head and used to determine the presence of obstacles in or nearby the boring path. Transmit and receive antennas are mounted on the drill shaft, behind the drill head spade, and transmit both ahead and to the side of the drill head. Data can be collected at up to 50 traces per second, and all processing and display is preferably done in real time.

Horizontal directional drilling provides numerous advantages over the historical trench based techniques, for subsurface utility installation. However, HDD does suffer from the constant threat of striking unknown, unmapped, or mis-located utilities and other obstacles. Striking these obstacles can cost the operator revenues, for repairs, or in more serious cases result in loss of equipment, injury, or death. Thus, there is a need for sensors that can be mounted on the drill head that detect obstacles far enough in advance to allow the drill operator to detect and/or map them. A derivative imaging object detection system incorporated into an HDD machine provides for detecting and/or mapping features or obstacles to allow their avoidance, which is of great importance, especially when damaging one of these features could result in disruption of utility service or possible contaminant release.

In general, underground urban utility corridors are becoming more and more congested. In these environments, smaller HDD rigs and shorter bore lengths are used to install new utility lines. Sensors to detect possible obstructions must therefore solve the partially contradictory requirements of being mounted on small drills, be used in congested areas, detect obstacles of varying materials and sizes, and yet not negatively impact production rates or be prohibitively expensive. Where drills are used to penetrate and assess the condition of waste sites or areas of potentially contaminated soils, penetration of underground storage tanks or drums could potentially result in release of toxic material and substantial environmental harm. Thus, any sensor must be capable of detecting not only linear, pipe-like targets, but also equi-dimensional targets like storage drums and tanks.

New and existing HDD machines can be equipped with an obstacle avoidance system of the present invention that includes a modified drill head containing a radar sensor package that can replace standard drill heads with a minimal amount of special fittings, tooling, and conversion packages. By way of example, relatively compact radar sensor packages are required to fit smaller class HDD machines, such as the Vermeer D7x11A and D20x22 Series II, which are typically used for shorter bores in more congested last-mile' installations. Important considerations to the functionality of such a radar sensor system are the power and communication transmissions that interface power generation, control, processing and operator interface hardware through the drill string to the drill head sensor.

Among the more important features of an obstacle avoidance system for HDD is the ability to acquire, process, and display information in real time, as the system is preferably implemented as an early warning device to operate during the drilling process. The system is preferably implemented to detect obstacles within its sensor field of view well enough in advance of the drill head so that the operator can stop the advance of the drill, and assess the situation. To achieve this requirement, the received sensor data must be acquired continuously, and converted into some form of an "image" for easy interpretation directly by the operator, and/or by the obstacle avoidance computer system. This is an important constraint on the design for the sensor hardware, software, antennas, and detection algorithm.

According to various embodiments of the present invention, a Stepped Frequency Continuous Wave (SFCW) radar is used to determine the presence of obstacles in or nearby a boring path of a drill of an HDD machine. SFCW radar data is used by a processor implementing derivative imaging software to form a subsurface image from a series of scans containing raw data that together form a synthetic aperture radar image. The SAR image may then be analyzed to determine time-dependent changes to the image as it is formed scan by scan. These changes in the evolving image associated with real targets can be identified well before the drill head position reaches the actual target location. These and other advantageous features of the present invention will now be described in greater detail and in reference to the accompanying drawings.

Figure 10:
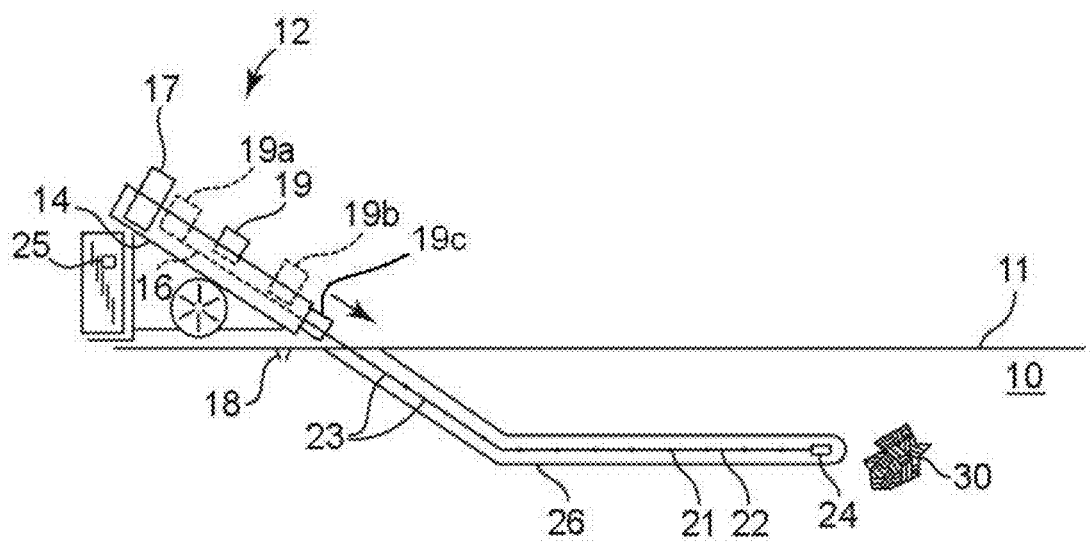
FIG. 10 shows a cross-section through a portion of ground where a boring operation takes place using an HDD machine in accordance with various embodiments.

FIG. 10 shows a cross-section through a portion of ground where a boring operation takes place. The underground boring system, generally shown as the boring machine 12, is situated above ground 11 and includes a platform 14 on which is situated a tilted longitudinal member 16. The platform 14 is secured to the ground by pins 18 or other restraining members in order to resist platform 14 movement during the boring operation. Located on the longitudinal member 16 is a thrust/pullback pump 17 for driving a drill string 22 in a forward, longitudinal direction as generally shown by the arrow. The drill string 22 is made up of a number of drill string members 23 attached end-to-end. Also located on the tilted longitudinal member 16, and mounted to permit movement along the longitudinal member 16, is a rotation motor or pump 19 for rotating the drill string 22 (illustrated in an intermediate position between an upper position 19a and a lower position 19b). In operation, the rotation motor 19 rotates the drill string 22 which has a boring tool 24 attached at the distal end of the drill string 22.

A typical boring operation can take place as follows. The rotation motor 19 is initially positioned in an upper location 19a and rotates the drill string 22. While the boring tool 24 is rotated through rotation of the drill string 22, the rotation motor 19 and drill string 22 are pushed in a forward direction by the thrust/pullback pump 17 toward a lower position into the ground, thus creating a borehole 26. The rotation motor 19 reaches a lower position 19*b* when the drill string 22 has been pushed into the borehole 26 by the length of one drill string member 23. A new drill string member 23 is then added to the drill string 22 either manually or automatically, and the rotation motor 19 is released and pulled back to the upper location 19*a*. The rotation motor 19 is used to thread the new drill string member 23 to the drill string 22, and the rotation/push process is repeated so as to force the newly lengthened drill string 22 further into the ground, thereby extending the borehole 26.

Commonly, water or other fluid is pumped through the drill string 22 (refereed to herein as mud) by use of a mud pump. If an air hammer is used, an air compressor is used to force air/foam through the drill string 22. The mud or air/foam flows back up through the borehole 26 to remove cuttings, dirt, and other debris and improve boring effectiveness and/or efficiency.

A directional steering capability is typically provided for controlling the direction of the boring tool 24, such that a desired direction can be imparted to the resulting borehole 26. By these actions, and various combinations of these basic actions, a boring procedure can advance a boring tool 24 through soil, including advancing the boring tool 24 through a turn.

Because HDD typically does not bore a hole very far from the surface of the ground, many belowground obstacles (e.g., sewers, electrical lines, building foundations, etc.) must be maneuvered around. As such, many boring tools are configured to allow the bore path to turn (e.g., left, right, higher, lower) to curve the bore path around underground obstacles.

In accordance with embodiments of the invention, the system also includes an encoder 19*c* to monitor of the position of the boring tool 24. As the drill head 24 is pushed into the ground, a cable plays out and advances the encoder 19*c*, providing the system software with a measure of the drill head location and triggering radar electronics at discrete distance intervals.

Figure 11:
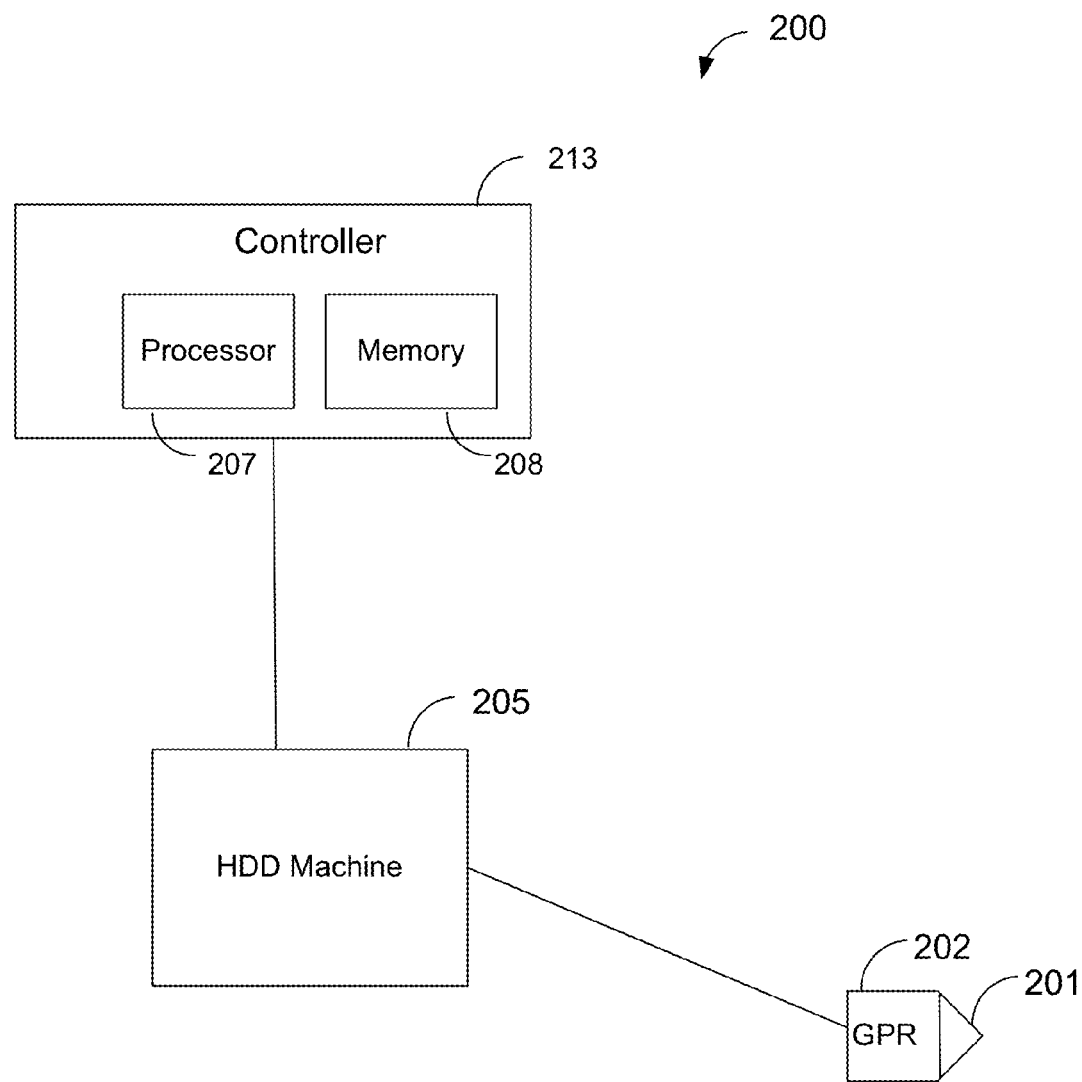
FIG. 11 is a block diagram of various HDD system components including a down-hole radar unit proximate to a boring tool in accordance with various embodiments.

FIG. 11 is a block diagram of various HDD system components 200 in accordance with embodiments of the invention. The HDD system of FIG. 11 includes down-hole radar unit 202, such as a GPR unit, proximate a boring tool 201. An exemplary GPR unit well suited for incorporation in a boring tool 210 in the context of various embodiments of the invention is disclosed in U.S. Pat. No. 7,013,991, previously incorporated herein by reference. The boring tool 201 may house an orientation sensor and/or a displacement rate sensor, such as a single- or multi-axis accelerometer, gyroscope, or magnetometer, for example. The boring tool 201 may also include one or more geophysical sensors, including a capacitive sensor, acoustic sensor, ultrasonic sensor, seismic sensor, resistivity sensor, and electromagnetic sensor, for example. Use of a down-hole GPR system provides for the detection of nearby buried obstacles and utilities, and characterization of the local geology.

According to an embodiment of the invention, a controller 213 is coupled to the HDD machine 205 which can be responsible for controlling underground object detection as described herein. The controller 213 can include a processor 207 and memory 208. The memory 208 can be a computer readable medium encoded with a computer program, software, computer executable instructions, instructions capable of being executed by a computer, etc., to be executed by circuitry, such as processor 207.

Execution of the computer program by the processor 207 causes the processor 207 to convert raw captured data into early warnings for obstacle avoidance. The raw data output from the processor 207 may be in the form of a series of complex 1-D scans with an amplitude value and a phase value, with reflection measurements at each frequency step within the measurement bandwidth. Typically, the complex scan vectors for a particular azimuthal angle of the drill head may be treated as column vectors, and may be stacked horizontally to form a pair of 2-D maps of the data, one for the real, and one for the imaginary part. Full 3-D complex data maps can be created by collecting a series of these 2-D maps, with one for each azimuthal angle at which data is collected as the drill head rotates. In these raw data maps, the horizontal dimension (the scan dimension) is in units of linear position of the drill head, and the vertical dimension is the transmitted frequency.

The computer executable instructions may also cause pre-processing and preparation of the raw sensor data. This pre-processing may include pre-filtering of the column vectors using a Hamming or other optimal smoothing window, plus a specially tailored filter that improves the contrast for certain features. This may be adjusted to fit specific soil conditions or target types. The computer executable instructions may also cause the reconstruction of the return signals. This may be done by calculation of the inverse Fast Fourier Transform (FFT) of the complex column vectors.

The computer executable instructions may additionally cause post-processing of the reconstructed signals. Several steps may be performed during post-processing. Phase I background subtraction can remove low-spatial-frequency background signals and noise because it uses a very large moving average window, but includes only the current scan, and scans that were taken prior to it. Phase II background subtraction may also be used. This is a small moving average window centered around the current scan and can remove high-spatial-frequency background noise. Time offset correction of the reconstructed return signal may additionally be performed, if necessary. Scaling of the reconstructed column vectors may optionally be performed. This is an attempt to normalize the energy of the return signal for each scan. It introduces an artifact because, in reality, certain scans will naturally return less energy if the medium is non-reflective or absorbing, for example, however the artifact can be desirable for visualizing certain objects in certain conditions. This processing step may have the ability to be turned on or off as needed. Additional smoothing and median filtering may then be done to the resulting signal.

The computer executable instructions may additionally run a SAR image reconstruction algorithm to build up an image for each 2-D azimuthal slice. The image is compiled scan-by-scan as the drill advances and data collected. The image is updated in real time. Some SAR pre-processing may be applied to each scan prior to adding the contribution of the scan to the reconstruction. This pre-processing could be a series of filters, including spatial filters that cut off signals that are at very long range, and suppressing the amplitude of the signals that are near range=0 (nearest the drill head).

The computer executable instructions may then run a target recognition algorithm. This algorithm can use the properties of the evolving SAR image as each new scan is processed and added to the reconstruction. The processor looks at the time-dependent (which is also scan-dependent) change in the SAR image as it evolves. The magnitude of the change may cause a positive detection of an object.

The computer executable instructions may additionally create a mask image and apply markers whenever object detection occurs. This mask image can be updated after each scan retaining the markers present from previous scans. This mask image can also be applied to the SAR image for further evaluation.

Figure 12:
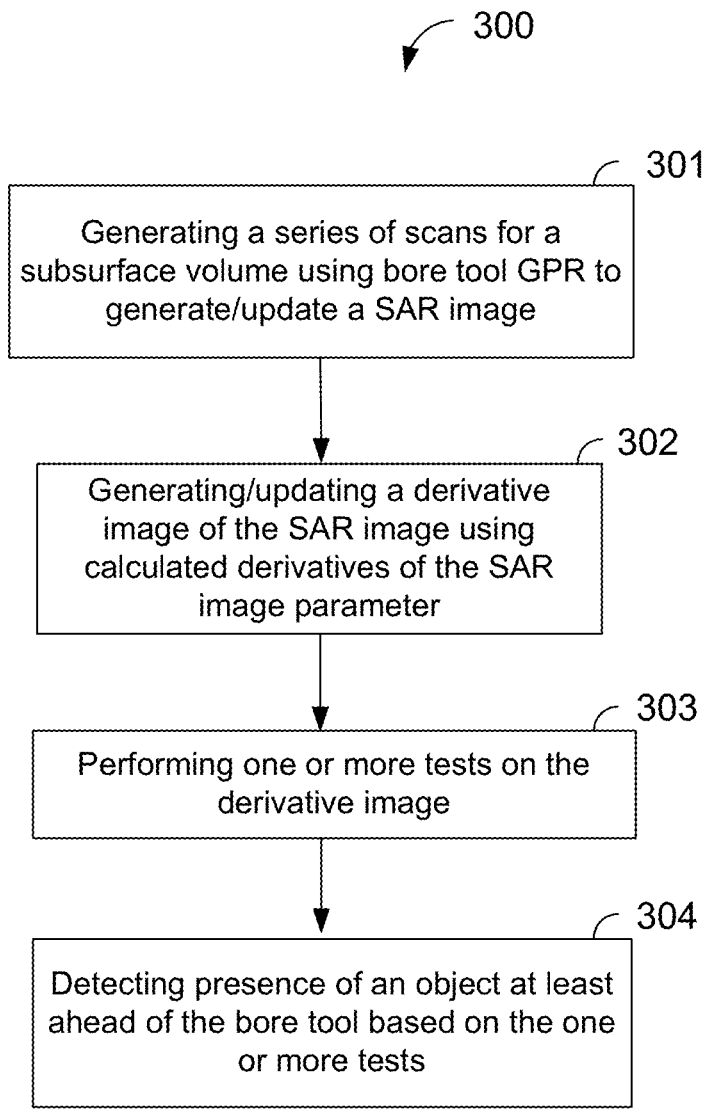
FIGS. 12-14 illustrate various processes of methods for automated obstacle detection in accordance with various embodiments.

FIG. 12 illustrates a flow chart in accordance with embodiments of the present invention. The flow chart describes a method 300 that includes generating 301 a series of radar scans using a GPR mounted bore tool for a subsurface volume. These scans may be used to build up a SAR image scan by scan. A derivative image of the SAR image may be created 302 using a parameter of the SAR image such as the change in time of a SAR image. The derivative can be calculated by using the mean value theorem, taylor expansion, cubic spline, curve fitting, among others. One or more tests are then performed 303 on the derivative image. The presence of an object at least ahead of the boring tool may then be detected 304 based on the one or more tests. These will be described in more detail below.

Figure 13:
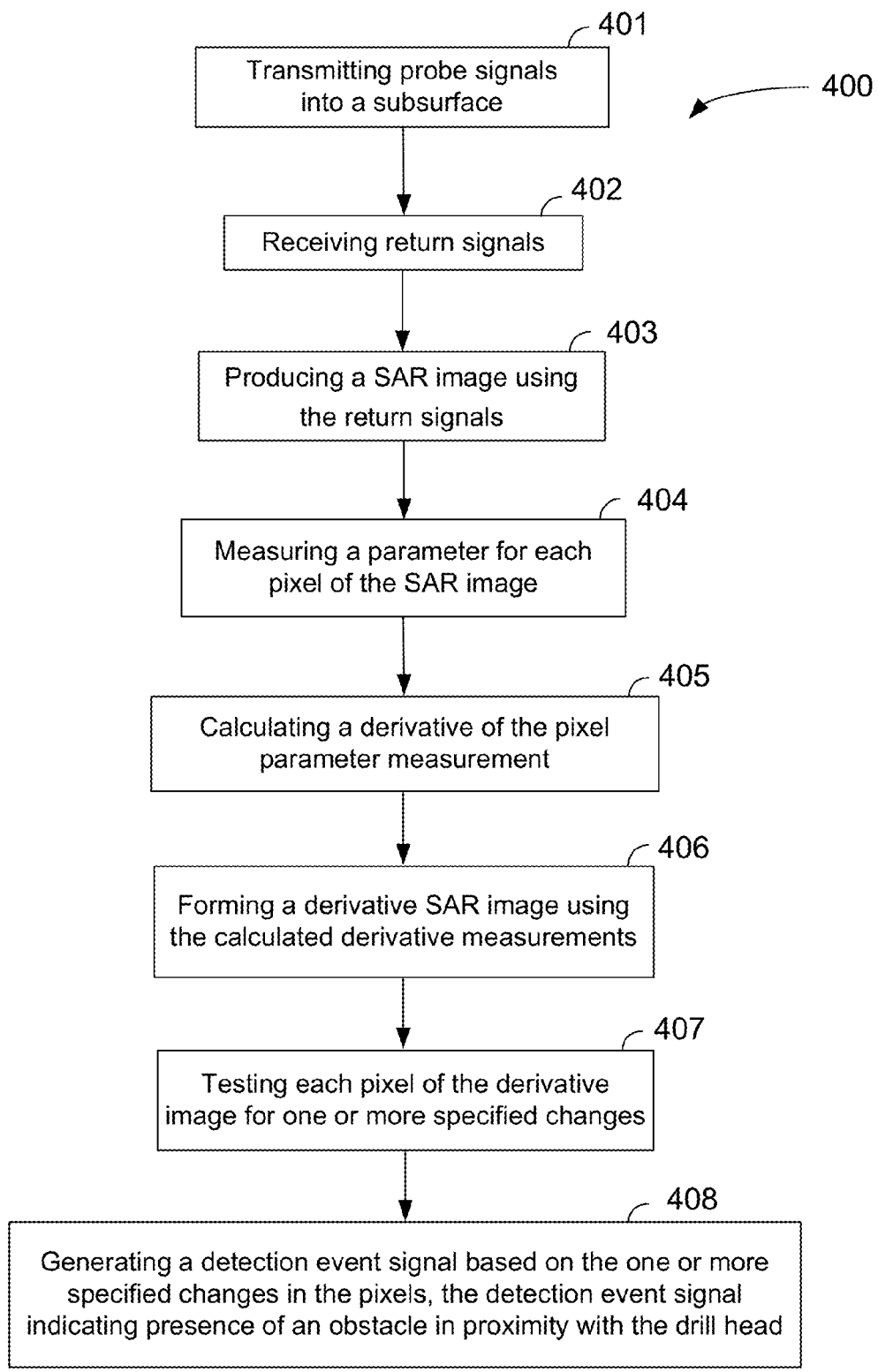

FIG. 13 illustrates another flowchart in accordance with various embodiments of the present disclosure. The flowchart of FIG. 13 illustrates a method 400 for automated obstacle detection. In block 401 a series of radar probe signals are transmitted using SFCW GPR. Return signals are then received 402. Pre-processing of the return signals may additionally be performed. Return signal reconstruction and post-processing of the reconstructed signals may also be performed. The returned signal scans are used to produce 403 a SAR image. The SAR image may additionally be cropped to illustrate a region within a certain distance in front of or to the sides of the drill head. The amount of returned signal energy for each pixel in the composite SAR image is then measured 404. A rate of change of the amount of returned signal energy is calculated 405 for each pixel of the SAR image. These derivative calculations are then used to form 406 a derivative image.

The derivative image may contain the time-dependent (or scan-dependent) change in the SAR image as it evolves. In addition, a second or higher derivative image may also be created. Each pixel of the derivative image or higher order derivative image is then tested 407 for one or more specified conditions with regard to the composite SAR image. The system may then generate 408 a detection event signal, which indicates the presence of an obstacle in proximity with the drill head, in response to at least one pixel in the derivative image or higher order derivative image meeting one or more specified conditions.

In additional embodiments of method 400, one or more specified conditions may be adjusted. Adjustments to the specified conditions can take place during initial system setup/calibration and/or "on the fly" during field operation. One or more thresholds may be set and/or adjusted automatically based on various properties of the soil, such as the dielectric constant. This allows for selection of optimum parameters for creating an image in a particular type of medium.

Figure 14:
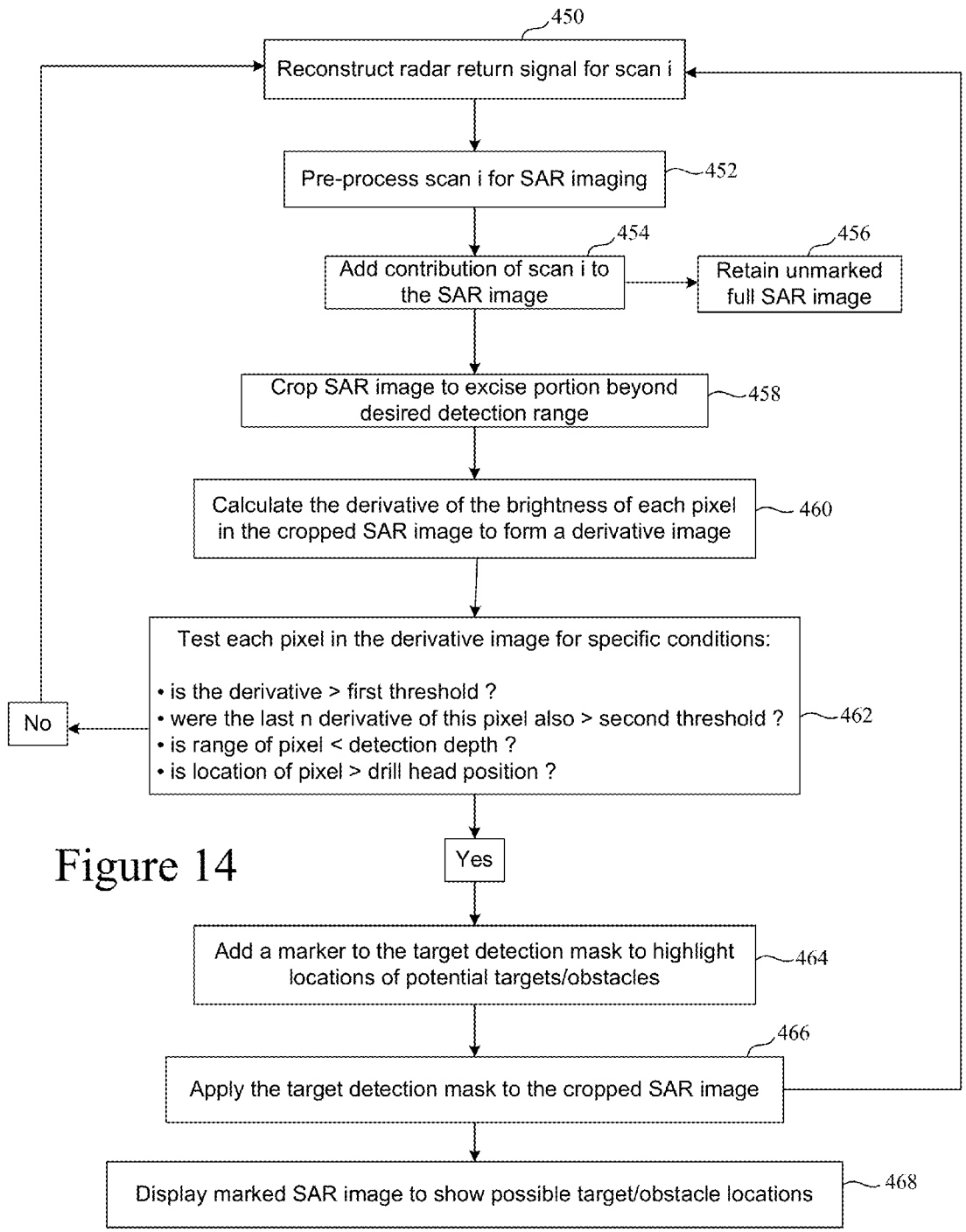

FIG. 14 illustrates various processes of a method for automated obstacle detection in accordance with embodiments of the present invention. The processes shown in FIG. 14 are preferably implemented in a system employing an SFCW radar. The method illustrated in FIG. 14 involves reconstructing 450 a radar return signal for scan i, where i is an integer, and pre-processing 452 the scan i data for SAR imaging. The contribution of the scan i data is added 454 to the SAR image. An unmarked full SAR image is preferably retained 456 in memory.

The SAR image is preferably cropped 458 to excise the portion of the SAR image that is beyond desired detection range. The derivative of the brightness of each pixel in the cropped SAR image is calculated 460 to form a derivative image. Each pixel in the derivative image is tested 462 for following specific conditions. In some embodiments, all of the following specific conditions must be met. In other embodiments, some but not all of the following specific conditions must be met:

is the derivative>first threshold ?
were the last n derivative of this pixel also>second threshold ?
is range of pixel<detection depth ?
is location of pixel>drill head position ?

If all or a sub-set of these specified conditions are met, a marker is added 464 to the target detection mask to highlight locations of potential targets/obstacles. The target detection mask is applied 466 to the cropped SAR image, and the marked SAR image is displayed 468 to show the possible target/obstacle locations. If all or the sub-set of these specified conditions are not met, control returns to block 450.

Figure 15:
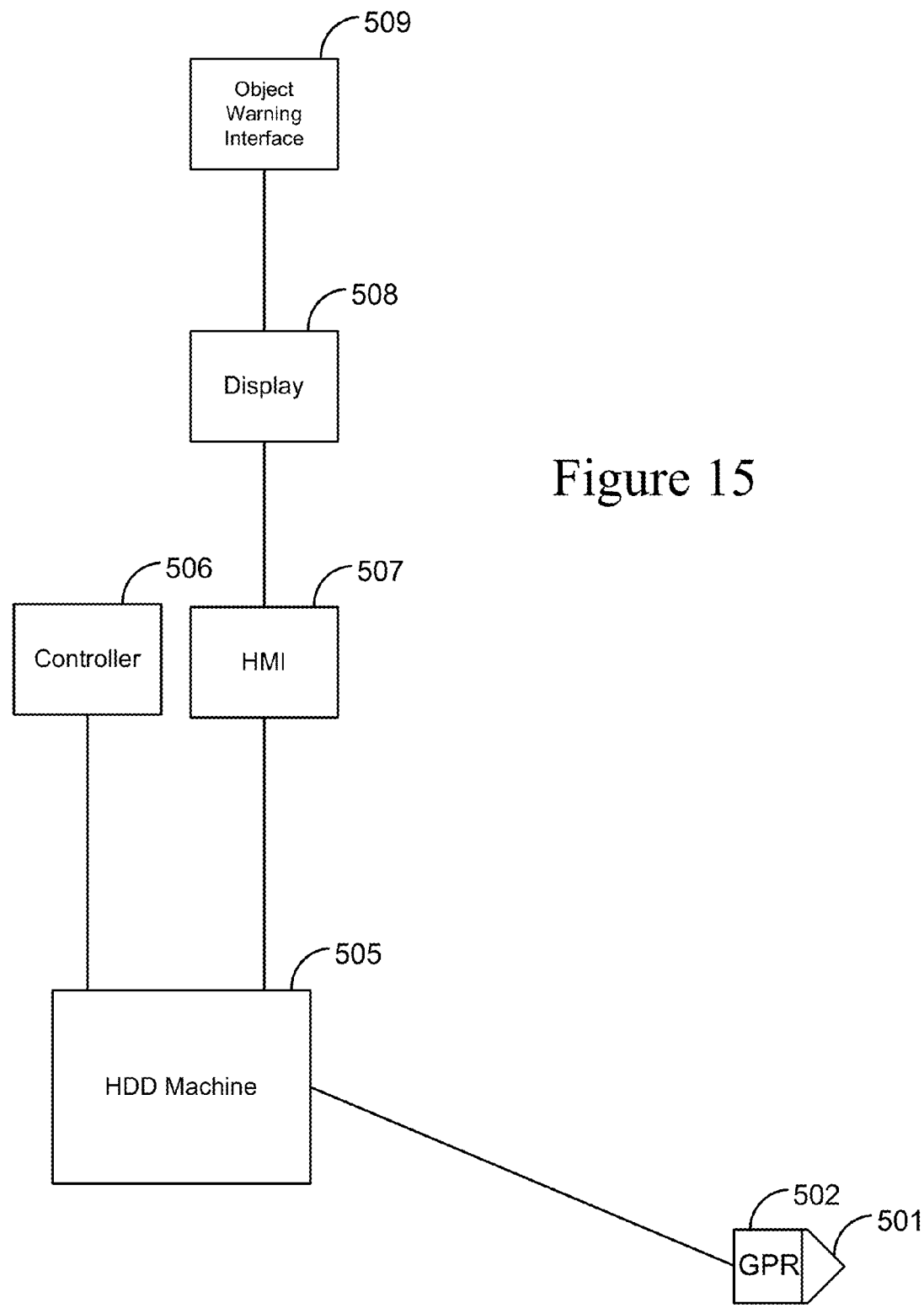
FIG. 15 is a block diagram showing various components of an HDD system implemented for derivative imaging object detection in accordance with various embodiments.

FIG. 15 is a block diagram showing various components of an HDD system implemented for derivative imaging object detection in accordance with embodiments of the invention. The HDD system component shown in FIG. 15 include a boring tool 501, a GPR unit 502, a HDD machine 505, and a controller 506, which are described hereinabove with reference to other figures. FIG. 15 also shows a human-machine interface (HMI) 507, a display 508, and an object warning interface 509 coupled to the display 508.

According to various embodiments, the HMI 507 provides the interface between the drill operator and radar sensor. The HMI 507 commands may control the radar via a simple text based protocol that operates over the drill string. The HMI 507 may provide functionality to configure the various modes of the system, the reconfigurable run time processing engine, and the display and storage of the data, for example. The HMI 507 software may also be provided with a measure of the drill advance, via an encoder for example. The acquired radar images may be displayed in real time on a display 508 coupled to the HMI 507 as each new scan is acquired and processed.

Some embodiments my further include an object warning interface or device 509 coupled to the display 508. The warning interface/device 509 can provide a warning when an object is detected. The warning could be presented in a visual way such as a light, for example, or there could be an auditory or tactile warning. The object warning interface/device may also use marker generation as a trigger. This could include the number or density of markers generated on the mask image.

Figure 16:
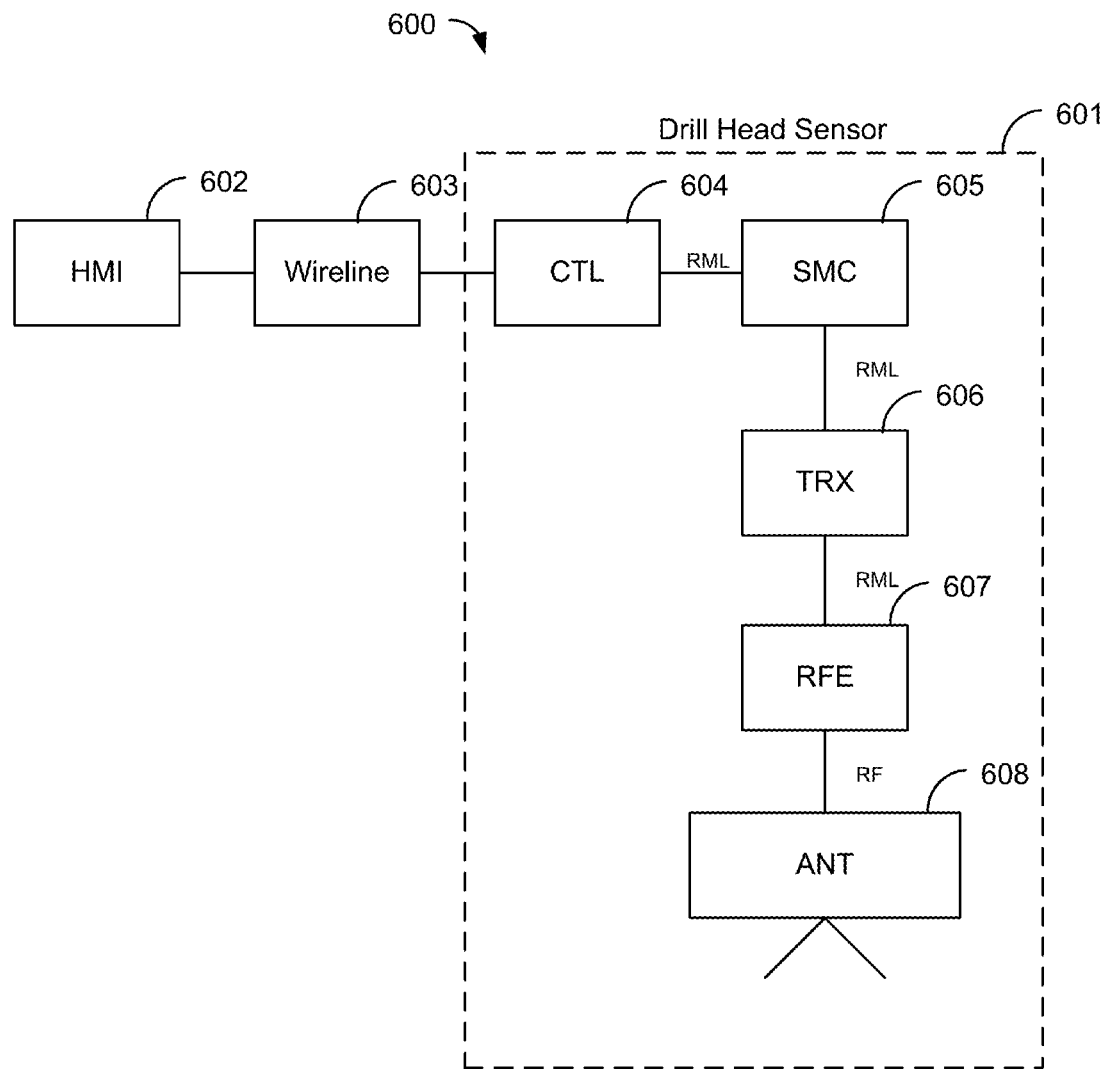
FIG. 16 is a block diagram of a Stepped Frequency Continuous Wave radar implemented as a drill head sensor of an HDD system in accordance with various embodiments.

Referring now to FIG. 16, a block diagram of the SFCW HDD sensor 600 in accordance with embodiments of the invention is shown. The components shown in FIG. 16 include an HMI 602, a wireline 603, and a drill head sensor 601. The drill head sensor 601 is shown to include a communication and radar controller (CTL) 604, a sampler and controller (SMC) 605, a radar transceiver (TRX) 606, a calibration module (RFE) 607, and an antenna interface 608.

In accordance with various, the HMI 602 may be used for the control, display and processing of the received radar data. The HMI 602 is connected via wireline 603 to the drill head sensor 601. The drill head sensor 601 measures the distance to targets using SFCW modulation. The SFCW sensor is realized using a dual synthesizer heterodyne architecture with digital IQ detection; the functionality of which is split between the SMC 605 and the radar transceiver 606.

The radar transceiver 606 includes transmit and receive synthesizers offset in frequency by the radar intermediate frequency (IF), along with required amplifiers and mixers to beat the frequency down to the IF, which is then sampled by the SMC 605 and converted to an analytic signal. The radar transceiver 606 can be designed to operate from 700 to 1700 MHz, with a receiver dynamic range in excess of 100 dB, for example.

In various embodiments of the invention, the transceivers are connected via a calibration module 607 to TX/RX bistatic radar antennas 608. The antennas are preferably designed to match soils with a wide range of permittivities. The RFE 607 both matches the radar impedance to that of the antenna 608 and provides a cable loop and terminations that allow for simple calibration of the radar sensor, including a reference for time zero at the inputs to the antennas 608. The CTL 604 is the main radar controller in the embodiment illustrated in FIG. 16. The CTL 604 configures and controls all the radar modules and implements the communication protocol that operates over a HomePlug™ wireline interface and allows for control of the radar drill head sensor 601 via the HMI 602.

An exemplary implementation will now be described for purposes of illustrations and not of limitation. With general reference to FIGS. 10, 11, and 15-17, the following exemplary implementation will be described in the context of HDD machine installation and operation. In this illustrative example, the drill head is designed in two segments. The segment closest to the nose of the drill head is the antenna module. The antenna module requires a space approximately 14 inches long, 1 inch wide, and 1.3 inches deep. Directly behind the antenna module is the second segment for the electronics module. The radar electronics module, including rotation sensor, power supply, and communication hardware is about 26 inches long, 1 inch wide, and 1.25 inches high. Both modules are designed to be "drop-in" packages that can be quickly and easily installed in the drill head.

A drill head that is 3 inches in diameter and 59 inches in length is more than sufficient to accommodate these components. Smaller drill heads may be desired when using smaller HDD machines. It is noted that a drill head with a larger diameter provides additional strength while drilling in view of the relatively large cavities required for the radar hardware. A traditional HDD operation requires a locating sonde placed inside the drill head to provide information to the drill operator regarding location, depth, and orientation of the drill head. A locating sonde may be included in some embodiments, in which case the sonde would be attached in a separate housing directly behind the drill head. As was discussed previously, an adaptation of the DCI CableLink® is permanently installed into the drill rods so that the mechanical and electrical connections occur automatically when the drill rods are threaded together.

During operation of the HDD machine, the drill head, with the radar electronics and antenna module enclosed, is attached to the end of the first drill rod by means of an adapter rod. All drill rod is equipped with the CableLink® system so the mechanical and electrical connections occur automatically when additional rods are threaded together during the drilling process. On the drill, the drill rod is connected to the drive chuck and commutator ring assembly. Radar signals and power are transmitted along the drill string through the commutator ring and two-conductor cable to the field instrumentation case. The field instrumentation case is interfaced with the data acquisition computer, distance encoder, and a 48 volt power supply. This equipment may be positioned on or next to the drilling machine during data collection.

The linear encoder is mounted to the HDD machine and connected to the drill chuck in order to log the advance of the drill rod and trigger the radar at controlled distance intervals. As the drill rod is pushed into the ground, a cable plays out and advances the encoder, providing the HMI software with a measure of the rod advance and triggering the radar electronics at discrete distance intervals. As the drill head is pushed into the ground, the radar images are acquired and displayed in real time on the computer display.

After a 10 ft section of drill rod is inserted into the ground, the operator typically pauses the radar data acquisition and disconnects the drill chuck from the drill string. This action temporarily disconnects the power supply to the radar electronics. Prior to the addition of another drill rod, the encoder cable retracts as the drill chuck retreats towards the back of the drill. As another rod is inserted and connected to the drill string, power is restored to the radar electronics and the operator resumes data collection. The drill string is pushed and rotated as necessary along the intended bore path. This process is repeated until the entire bore is completed.

At the completion of the bore, the drill head is removed and a backreamer, sized slightly larger than the product being installed, is attached. A swivel attaches multiple sizes and styles of pipe or cable to the backreamer. At the directional drill, each rod is subsequently pulled back and removed until the backreamer and product are pulled through the entire bore path.

Embodiments of the invention are directed to systems and methods of mapping underground utilities that have been detected using derivative imaging methodologies described herein. Embodiments of the invention are also directed to systems and methods of acquiring and storing mapping data in a database, and to systems and methods of providing access to and use of stored mapping data by subscribing users. Embodiments of the invention are directed to generating a map of the detected utilities, and incorporating mapping data within a GIS or other geographic reference system. A 2-D map and/or a 3-D map of detected utilities can be generated. Utility maps and other data associated with physical parameters of the subsurface or of the detected utilities may be displayed, such as by use of an operator interface. Additional details for implementing utility mapping and managing utility mapping data in the context of various embodiments of the invention are disclosed in commonly owned U.S. Pat. No. 6,751,553, which is incorporated herein by reference.

The discussion and illustrations provided herein are presented in an exemplary format, wherein selected embodiments are described and illustrated to present the various aspects of the present invention. Systems, devices, or methods according to the present invention may include one or more of the features, structures, methods, or combinations thereof described herein. For example, a device or system may be implemented to include one or more of the advantageous features and/or processes described below. A device or system according to the present invention may be implemented to include multiple features and/or aspects illustrated and/or discussed in separate examples and/or illustrations. It is intended that such a device or system need not include all of the features described herein, but may be implemented to include selected features that provide for useful structures, systems, and/or functionality.

Although only examples of certain functions may be described as being performed by circuitry for the sake of brevity, any of the functions, methods, and techniques can be performed using circuitry and methods described herein, as would be understood by one of ordinary skill in the art.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A method, comprising:
generating, using a sensor, a series of scans for a subsurface while conducting a survey;
creating, while conducting the survey, a derivative image using a processor operating on the series of subsurface scans;
performing one or more tests on the derivative image using the processor; and
detecting, using the processor, a subsurface object based on the one or more tests.

2. The method of claim 1, wherein:
the series of scans is generated by a source; and
detecting the subsurface object comprises detecting a change in relative distance between the source and the subsurface object in advance of contact therebetween based on the one or more tests.

3. The method of claim 1, wherein the method is implemented as part of a horizontal directional drilling process.

4. The method of claim 1, wherein detecting the subsurface object comprises:
sensing for the subsurface object within a predetermined detection zone; and
ignoring subsurface objects for detection that are beyond the detection zone.

5. The method of claim 1, comprising producing a human-perceivable output while conducting the survey in response to detecting the subsurface object.

6. A method, comprising:
generating, using a sensor, a series of scans for a subsurface;
creating a derivative image in real time using a processor operating on the series of scans, the derivative image being associated with underground object information; and
producing, by the processor, real time underground object information while generating the series of scans and creating the derivative image.

7. The method of claim 6, wherein the underground object information comprises information about presence and location of an underground object.

8. The method of claim 6, comprising generating, in real time, a human-perceivable output using the underground object information.

9. A method, comprising:
moving a drill head along an underground path during a drilling operation;
generating, using a sensor, a series of scans for a subsurface that includes the underground path;
creating a derivative image using a processor operating on the series of scans;
performing one or more tests on the derivative image using the processor; and
generating, using the processor during the drilling operation, an output indicating presence of a subsurface object proximate the drill head based on the one or more tests.

10. The method of claim 9, wherein the output indicates distance and azimuthal direction to the subsurface object.

11. The method of claim 9, comprising displaying, during the drilling operation, a graphical representation that includes the subsurface object using the output.

12. The method of claim 11, comprising:
presenting one or more markers in the graphical representation in response to meeting criteria for the existence of the subsurface object in proximity to the drill head;
wherein the number of markers presented in the graphical representation is indicative of a level of confidence in correctly detecting the subsurface object.

13. A method, comprising:
generating, using a sensor at-ground or above-ground, a series of scans for a subsurface, each scan generated for a different location of the subsurface;
compiling an image using a processor operating on the scans on a scan-by-scan basis;
determining, using the processor, a change in the compiled image as the compiled image evolves; and
detecting, using the processor, a subsurface object based on the change in the compiled image.

14. The method of claim 13, wherein the method is implemented in real time while surveying the subsurface from at- or above-ground.

15. The method of claim 13, comprising generating, in real time, a human-perceivable indication in response to detecting the subsurface object.

16. The method of claim 13, comprising:
displaying a graphical representation that includes the subsurface object; and
presenting one or more markers in the graphical representation in response to meeting criteria for the existence of the subsurface object;
wherein the number of markers presented in the graphical representation is indicative of a level of confidence of correctly detecting the subsurface object.

17. A system, comprising:
a housing configured for at-ground or above-ground portability;
a sensor supported by the housing and configured to generate a series of scans for a subsurface from at-ground or above-ground, each scan generated for a different location of the subsurface; and
a processor configured to compile an image using the scans on a scan-by-scan basis, determine a change in the compiled image as the compiled image evolves, and detect a subsurface object based on the change in the compiled image.

18. The system of claim 17, wherein the housing is coupled to a structure movable over ground.

19. The system of claim 17, comprising a display coupled to the processor and configured to generate, in real time, a visually perceivable indication in response to detecting the subsurface object.

20. The system of claim 17, comprising:
a display coupled to the processor and configured to display a graphical representation that includes the subsurface object, wherein:

the processor is configured to present one or more markers in the graphical representation in response to meeting criteria for the existence of the subsurface object; and the number of markers presented in the graphical representation is indicative of a level of confidence in the processor correctly detecting the subsurface object.

* * * * *